United States Patent
Lee et al.

(10) Patent No.: US 7,817,212 B2
(45) Date of Patent: Oct. 19, 2010

(54) LASER VIDEO PROJECTOR HAVING MULTI-CHANNEL ACOUSTO-OPTIC MODULATOR, AND METHOD AND CIRCUIT FOR DRIVING THE SAME

(75) Inventors: Jin-ho Lee, Suwon (KR); Sang-whoe Dho, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 940 days.

(21) Appl. No.: 11/655,827

(22) Filed: Jan. 22, 2007

(65) Prior Publication Data

US 2007/0115395 A1 May 24, 2007

Related U.S. Application Data

(63) Continuation of application No. 10/385,524, filed on Mar. 12, 2003, now Pat. No. 7,184,103.

(30) Foreign Application Priority Data

Mar. 12, 2002 (KR) ................. 2002-13256

(51) Int. Cl.
*H04N 5/74* (2006.01)
*G01S 3/00* (2006.01)
(52) U.S. Cl. ............. 348/744; 348/756; 372/38.02
(58) Field of Classification Search ........... 348/744, 348/754, 760, 781, 758; 353/31, 82; 359/212.2, 359/216.1; 345/204, 690; 372/29.01, 38.02
See application file for complete search history.

(56) References Cited

U.S. PATENT DOCUMENTS

| | | | |
|---|---|---|---|
| 4,297,723 A | 10/1981 | Whitby | |
| 4,470,075 A | 9/1984 | Yoshimoto et al. | |
| 4,686,542 A | 8/1987 | Yip et al. | |
| 4,689,482 A | 8/1987 | Horikawa et al. | |
| 5,136,426 A | 8/1992 | Linden et al. | |
| 5,253,073 A | * 10/1993 | Crowley | ............ 348/760 |

(Continued)

FOREIGN PATENT DOCUMENTS

JP 59-019922 2/1984

(Continued)

OTHER PUBLICATIONS

Notice to submit response issued by Korean Patent Office on Mar. 29, 2004 for corresponding Korean Patent Application No. 10-2002-0013256.

(Continued)

*Primary Examiner*—Victor Kostak
(74) *Attorney, Agent, or Firm*—Harness, Dickey & Pierce, P.L.C.

(57) ABSTRACT

Provided are a laser video projector having a multi-channel acousto-optic modulator, and a method and circuit for driving the laser video projector. The laser video projector includes a light generating portion, an optic modulator, an optic combining portion, and an optic scanning portion. The light generating portion emits light to be used to project a video image. The optic modulator modulates the light incident from the light generating portion by using the video signal. The optic combining portion combines modulated light beams emitted from the optic modulator. The optic scanning portion scans light incident from the optic combining portion on a screen. The optic modulator has six or more optic modulation channels so that a plurality of red light beams, a plurality of green light beams, and a plurality of blue light beams incident in a state suitable for optic modulation are simultaneously modulated. Accordingly, limitations in the performance of an optic modulator and an optic scanner can be overcome. Also, a laser video projector can be made small. In addition, the degree of freedom for arranging components increases and the components can be well arranged. Furthermore, a video image of high brightness can be realized.

4 Claims, 13 Drawing Sheets

U.S. PATENT DOCUMENTS

| | | |
|---|---|---|
| 5,424,771 A | 6/1995 | Yu |
| 5,546,492 A | 8/1996 | Ansley et al. |
| 5,614,961 A | 3/1997 | Gibeau et al. |
| 5,879,065 A * | 3/1999 | Shirochi et al. ............ 353/8 |
| 5,920,361 A | 7/1999 | Gibeau et al. |
| 5,936,986 A * | 8/1999 | Cantatore et al. ...... 372/38.02 |
| 6,137,461 A | 10/2000 | Deter et al. |
| 6,154,259 A | 11/2000 | Hargis et al. |
| 6,170,749 B1 * | 1/2001 | Goren et al. ......... 235/462.06 |
| 6,170,953 B1 | 1/2001 | Lee et al. |
| 6,175,440 B1 | 1/2001 | Conemc |
| 6,309,072 B1 | 10/2001 | Deter |
| 6,317,170 B1 | 11/2001 | Hwang et al. |
| 6,449,083 B1 | 9/2002 | Nishiyama |

FOREIGN PATENT DOCUMENTS

| | | |
|---|---|---|
| JP | 61-109022 | 5/1986 |
| JP | 63027814 | 2/1988 |
| JP | 09134135 | 5/1997 |
| JP | 2000-505275 | 4/2000 |
| JP | 2000-221460 | 8/2000 |
| KR | P1999-0029124 | 4/1999 |
| KR | 10-0278638 | 10/2000 |
| WO | 94/18802 A | 1/1994 |

OTHER PUBLICATIONS

Communication—Partial European Search Report issued by the European Patent Office on Mar. 24, 2004 for corresponding European Patent Application No. EP 03 25 1444.

Japanese Office Action dated Mar. 4, 2008.

* cited by examiner

LASER VIDEO PROJECTOR HAVING MULTI-CHANNEL ACOUSTO-OPTIC MODULATOR, AND METHOD AND CIRCUIT FOR DRIVING THE SAME

This application claims the priority of Korean Patent Application No. 2002-13256, filed on Mar. 12, 2002, in the Korean Intellectual Property Office, the disclosure of which is incorporated herein in its entirety by reference.

BACKGROUND OF THE INVENTION

1. Field of the Invention

The present invention relates to a laser video projector, and more particularly, to a laser video projector having a multi-channel acousto-optic modulator, and a method and circuit for driving the same.

2. Description of the Related Art

Lasers are used in various types of displays because of their optical characteristics, e.g., a monochromatic characteristic having a line spectrum almost close to zero, a straightforward characteristic, a condensing characteristic, high brightness, and the like.

In a display, a laser can realize three times more natural colors than a fluorescent substance. Also, when compared with a lamp, the laser can greatly improve the optical conversion efficiency and reduce the power consumption necessary for obtaining the same brightness. Thus, heat generated in the display system can greatly decrease. In addition, in a case where the laser is used as a light source in a display, the lifetime of the light source can be 10,000 hours or more. Furthermore, a video image having high brightness and high clearness can be realized on a large-scale screen using the high brightness of the laser.

FIG. 1 is a schematic view of a laser video projector, a kind of display using a laser as a light source. Here, reference numeral 900 denotes a screen on which a video signal is projected. Reference numeral 850 denotes a reflector plate which reflects the video image incident from downward to project the video image on the screen 900. Reference numeral 750 denotes an optical engine which forms the video image and scans the video image onto the reflector plate 850.

As shown in FIG. 2, the optical engine 750 includes a plurality of elements as well as a light source 100 which emits a white laser that will be used for forming the video image.

In detail, a first collimating lens 220, which changes the white laser to parallel laser light, is positioned in front of an emitting surface of the light source 100 that emits the white laser. A first high reflection mirror 210, which changes the optical path of the parallel laser light, is placed in front of the first collimating lens 220. The first collimating lens 220 includes a plurality of lenses to correct the chromatic aberration of the parallel laser light. The first collimating lens 220 and the first high reflection mirror 210 exist in the same optical path. The parallel laser light is incident on an optical separator 250 via the first high reflection mirror 210. The optical separator separates the parallel laser light into three monochromatic light beams, i.e., a blue light beam B, a green light beam G, and a red light beam R. The optical separator 250 has a first dichroic mirror 670a that separates the blue light beam B from the parallel laser light, a second dichroic mirror 680a that separates the green light beam G from the parallel laser light that passed through the first dichroic mirror 670a, and a second high reflection mirror 690a that reflects the red light beam R that passed through the second dichroic mirror 680a to change the optical path of the red light beam R. A first focusing lens 640a focuses the blue light beam B separated from the parallel laser light by the first dichroic mirror 670a on a first acousto-optic modulator 610. A second focusing lens 650a focuses the green light beam G separated by the second dichroic mirror 680a on a second acousto-optic modulator 620. A third focusing lens 660a focuses the red light beam R reflected by the second high reflection mirror 690a on a third acousto-optic modulator 630. The red, green, and blue light beams R, G, and B focused on the first, second, and third acousto-optic modulators 610, 620, and 630 are modulated using an input video signal. The second, third, and fourth collimating lenses 640b, 650b, and 660b in the rear of the first, second, and third acousto-optic modulators 610, 620, and 630 make the blue, green, and red light beams B', G', and R' modulated by the first, second, and third acousto-optic modulators 610, 620, and 630 into parallel light beams like the red, green, and blue light beams R, G, and B which are not yet incident onto the first, second, and third focusing lens 640a, 650a, and 660a. First, second, and third apertures A1, A2, and A3 are placed between the second, third, and fourth collimating lenses 640b, 650b, and 660b and the first, second, and third acousto-optic modulators 610, 620, and 630. The first, second, and third apertures A1, A2, and A3 intercept components of the modulated light beams, emitted from the first, second, and third acousto-optic modulators 610, 620, and 630, deviating from optical axes of the second, third, and fourth collimating lenses 640b, 650b, and 660b from being incident on the second, third, and fourth collimating lenses 640b, 650b, and 660b. The first, second, and third apertures A1, A2, and A3 are close to the second, third, and fourth collimating lenses 640b, 650b, and 660b, respectively. The modulated light beams B', G', and R' which passed through the second, third, and fourth collimating lenses 640b, 650b, and 660b are incident on an optical combiner 650 to combines the light beams B', G', and R' into a light beam B'+G'+B'. When the modulated red light beam R' reflected by a third high reflection mirror 690b of the optical combiner 650 passes through a fourth dichroic mirror 680b existing on the same optical path as the third collimating lens 650b, the modulated red light beam R' is combined to the modulated green light beam G' reflected by the fourth dichroic mirror 680b. The combined light beam G'+B' is reflected by the third dichroic mirror 670b existing on the same optical path as the second collimating lens 640b and combined with the modulated blue light beam B' passing through the third dichroic mirror 670b into the light beam R'+G'+B'. The light beam R'+G'+B' is reflected by a fourth high reflection mirror 710 existing on the same optical path as the third dichroic mirror 670b so as to go toward a polygon mirror 800, which is a optical scanner having a plurality of reflection surfaces that are positioned on the same plane as the fourth reflection mirror 710 to periodically scan incident light in a given direction. The light beam R'+G'+B' incident on the polygon mirror 800 is reflected by the reflection surfaces of the polygon mirror 800 and horizontally scanned. The light beam R'+G'+ B' passes through first and second relay lenses 310 and 320 between the polygon mirror 800 and the galvanometer 700 and is focused on a mirror surface 700a of a galvanometer 700. The focused light beam R'+G'+B' is vertically scanned by the mirror surface 700a of the galvanometer 700. The horizontally and vertically scanning of the light beam R'+G'+ B' results in forming a video image, which is reflected by the reflector plate 850 shown in FIG. 1 and projected on the screen 900.

In the above-described conventional laser video projector, the resolution of the video image projected on the screen 900 depends on the first, second, and third acousto-optic modulators 610, 620, and 630 and the polygon mirror 800.

In general, the video signal processing performance of an acousto-optic modulator (AOM) depends on the focusing intensity of a laser. Since the focusing degree of the laser depends on the size of a laser beam, quality of the laser, and a focusing lens used, the laser is limited in being focused to more than predetermined degree. Thus, the conventional laser video projector can process a video image corresponding to an XGA video signal. However, it is very difficult for the conventional laser video projector to process the video image having a resolution higher than XGA. Also, the number of horizontal scan lines scanned by the polygon mirror 800 depends on the number of mirror surfaces of the polygon mirror 800 and the rotating speed of the polygon mirror 800. However, since the conventional laser video projector has a limitation in increasing the number of mirror surfaces and the rotating speed, it is quite difficult for the conventional laser video project to process a video image having a resolution higher than XGA.

In a case where a current MEMS scanner is used, the conventional laser video projector has difficulty realizing a video having a resolution higher than the resolution of an XGA video image due to its operational speed.

As described above, it is difficult to obtain a video image having a resolution higher than that of an XGA video image by using the conventional laser video projector due to a limited performance of an acousto-optic modulator and an optical scanner.

SUMMARY OF THE INVENTION

Accordingly, the invention provides a laser video projector which can realize a video image having a resolution higher than the resolution of an XGA video image and whose size can be reduced.

The present invention provides a method for operating the laser video projector.

The present invention provides a circuit for driving the laser video projector.

According to an aspect of the present invention, there is provided a laser video projector including a light generating portion, an optic modulator, an optic combining portion, and an optic scanning portion. The light generating portion emits light to be used to project a video image. The optic modulator modulates the light incident from the light generating portion by using the video signal. The optic combining portion combines modulated light beams emitted from the optic modulator. The optic scanning portion scans light incident from the optic combining portion on a screen. The optic modulator has six or more optic modulation channels so that a plurality of red light beams, a plurality of green light beams, and a plurality of blue light beams incident in a state suitable for optic modulation are simultaneously modulated.

Here, the optic modulator includes first through third multi-channel acousto-optic modulators, each having at least two or more optic modulation channels or includes one multi-channel acousto-optic modulator having the at least six or more optic modulation channels.

The light generating portion includes a light source portion, a first optical path changing portion, first and second light transmission/reflection portions, a second optical path changing portion, first through third monochromatic separators, and first through third groups of lenses. The light source portion emits the light to be used to project the video image. The first optical path changing portion changes an optical path of the light emitted from the light generating portion. The first and second light transmission/reflection portions sequentially separate first and second monochromatic light beams from the light incident from the first optical path changing portion. The second optical path changing portion changes an optical path of light incident from the second light transmission/reflection portion. The first through third monochromatic separators equally separate light beams incident from the first and second light transmission/reflection portions and the second optical path changing portion as many as optic modulation channels in the optic modulator. The first through third groups of lenses correspond on a one-to-one basis to the first through third monochromatic separators to focus light beams incident from the first through third monochromatic separators on the channels in the optic modulator.

At least one of the first through third monochromatic separators is a transmissible plate that equally separates light beams incident from the first and second light transmission/reflection portions and the second optical path changing portion by using an internal reflection process of multi-steps or includes first through fourth beam splitters.

According to another aspect of the present invention, the light generating portion includes a light source portion that emits as many laser light beams as the optic modulation channels in the optic modulator, and groups of lenses that are positioned between the optic modulator and the light source portion, correspond on a one-to-one basis to the optic modulation channels, and focus the emitted laser light beams on the optic modulation channels.

Here, the light generating portion further includes optic transmitters that are placed between the light generating portion and the groups of lenses and transmit laser light beams emitted from the light generating portion to the groups of lenses. The optic transmitters are as many optical fibers as laser light beams emitted from the light generating portion.

The optic combining portion includes fourth through sixth groups of lenses, a third optical path changing portion, a third light transmission/reflection portion, and a fourth light transmission/reflection portion. The fourth through sixth groups of lenses change modulated light beams emitted from the optic modulator to parallel light beams. The third optical path changing portion changes optical paths of light beams incident from the fourth group of lenses. The third light transmission/reflection portion reflects light beams incident from the fifth group of lenses and transmits light beams incident from the third optical path changing portion so that the light beams incident from the fifth group of lenses are combined with the light beams incident from the third optical path changing portion. The fourth light transmission/reflection portion reflects light beams incident from the sixth group of lenses and transmits light beams incident from the third light transmission/reflection portion so that the light beams incident from the sixth group of lenses are combined with the light beams incident from the third light transmission/reflection portion.

According to still another aspect of the present invention, the light coupling portion includes optic transmitters, first micro focusing lenses, and second micro focusing lenses. The optic transmitters combine and transmit modulated red, green, and blue laser light beams emitted from the optic modulation channels to the optic scanning portion. The first micro focusing lenses are placed at ends of the optic transmitters to focus the modulated laser light beams emitted from the optic modulation channels on the optic transmitters. The second micro focusing lenses are placed at the other ends of the optic transmitters so that light transmitted via the optic transmitters is incident on the optic scanning portion.

Here, the optic transmitters are optical fibers that are as many as the optic modulation channels but reduce to ⅓ while advancing toward the optic scanning portion.

The optic scanning portion includes a first focusing lens, a first optic scanner, a second optic scanner, a relay lens system, and a second focusing lens. The first focusing lens that focuses light beams incident from the optic combining portion. The first optic scanner that reflects the light focused by the first focusing lens so that the light is horizontally scanned on the screen. The second optic scanner determines the vertical position of the light reflected by the first optic scanner to scan the light on the screen. The relay lens system that is placed between the first and second optic scanners and focuses the light reflected by the first optic scanner on the second optic scanner. The second focusing lens is placed between the screen and the second optic scanner to control the vertical position of light projected on the screen.

According to still yet another aspect of the present invention, the laser video projector further includes a reflector plate that is placed above the second optic scanner to project light reflected by the second optic scanner on the screen via the second focusing lens.

According to yet another aspect of the present invention, there is also provided a method for driving a laser video projector including an analog/digital converter that converts an analog video signal to a digital signal and a plurality of FIFO memories that are connected to the analog/digital converter to write the digital signal. Here, video signals read from the analog/digital converter are sequentially written in the plurality of FIFO memories, and the video signals are read from the plurality of FIFO memories when a video signal is written in the last one of the plurality of FIFO memories.

Here, the video signals are read from the plurality of FIFO memories at a speed lower than a speed for writing the video signals in the plurality of FIFO memories.

According to yet another aspect of the present invention, there is also provided a circuit for driving a laser video projector including an analog/digital converter that converts an analog signal to a digital signal, a memory in which the analog signal is written, digital/analog converters that convert video information read from the memory to analog signals, and an optic modulator that modulates light by using the analog signal read from the digital/analog converter. Here, the memory includes a plurality of FIFO memories in which video signals read from the analog/digital converter are sequentially written, the number of the digital/analog converters is equal to the number of the plurality of FIFO memories, and the optic modulator includes as many optic modulation channels as the plurality of FIFO memories.

According to the present invention, limitations in the performance of the optic modulator and the optic scanner can be overcome, and the laser video projector can be made very small. Also, since components can be disposed in predetermined positions due to optical fibers, the degree of freedom for arranging the components increases. In addition, since the optical fibers can be easily arranged by using arrangement stages, the components can be well arranged. Furthermore, in a case where a plurality of semiconductor laser diodes are used, a video image of high brightness can be realized by collecting a low power laser diodes.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
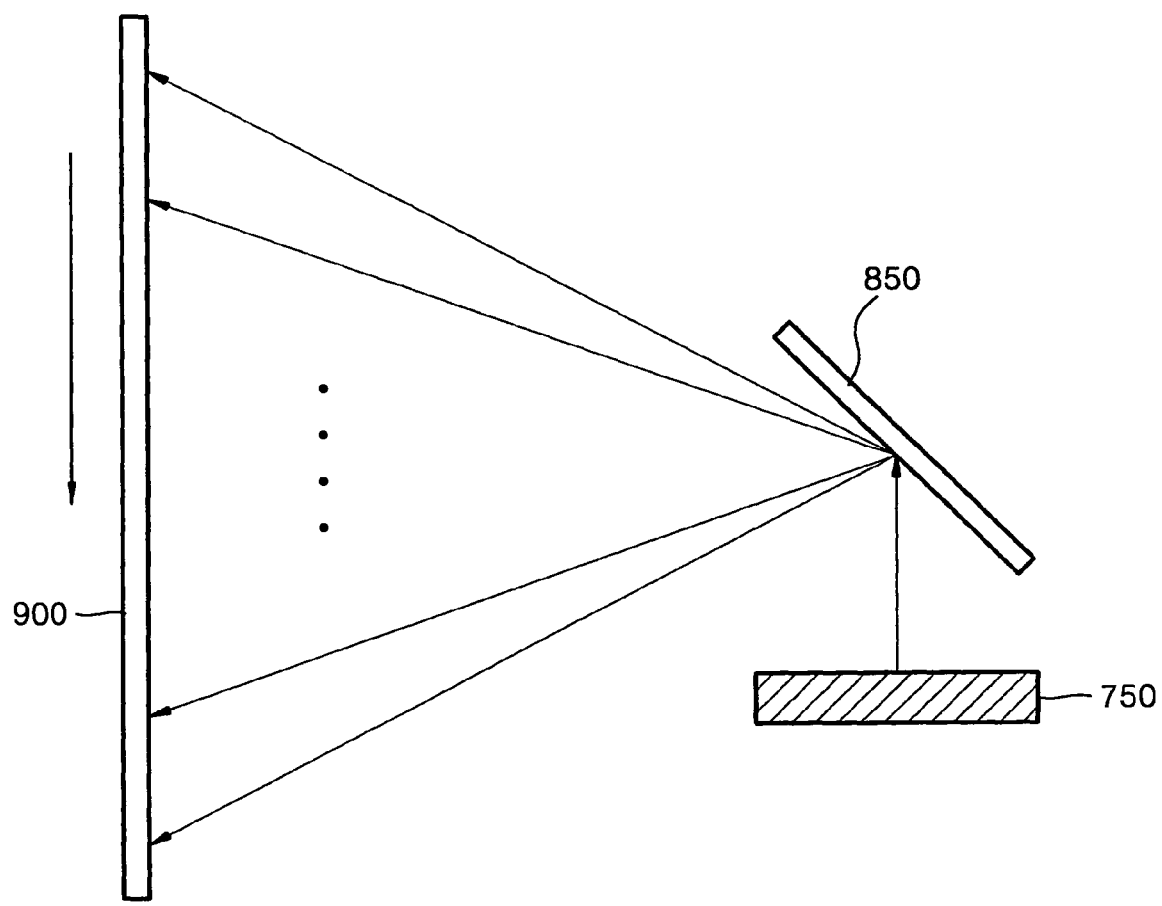
FIG. 1 is a schematic view of the configuration of a laser video projector according to the prior art.
Figure 2:
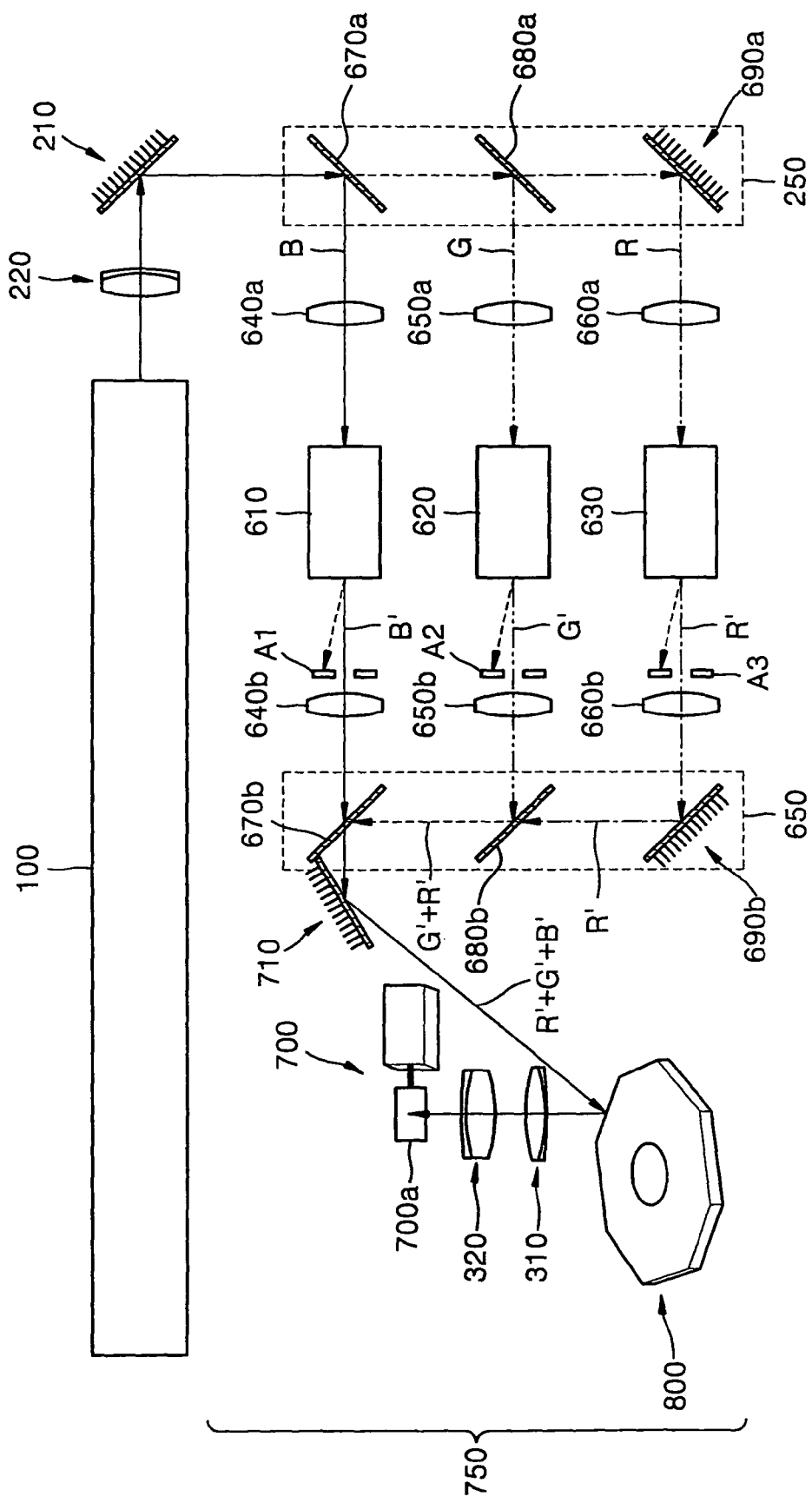
FIG. 2 is a plan view of the configuration of an optical engine of the laser video projector shown in FIG. 1.

Hereinafter, a laser video projector according to embodiments of the present invention, and a method and circuit for driving the same will be described in detail with reference to the attached drawings. In the drawings, the thicknesses of layers or regions are exaggerated for clarity.

First, the laser video projector according to the embodiments of the present invention will be described. Here, since two or more lines are scanned on a screen at the same time, an optic modulator may include at least six or more channels. However, let us assume that four lines are scanned on a screen at the same time and the optic modulator includes twelve channels.

Figure 3:
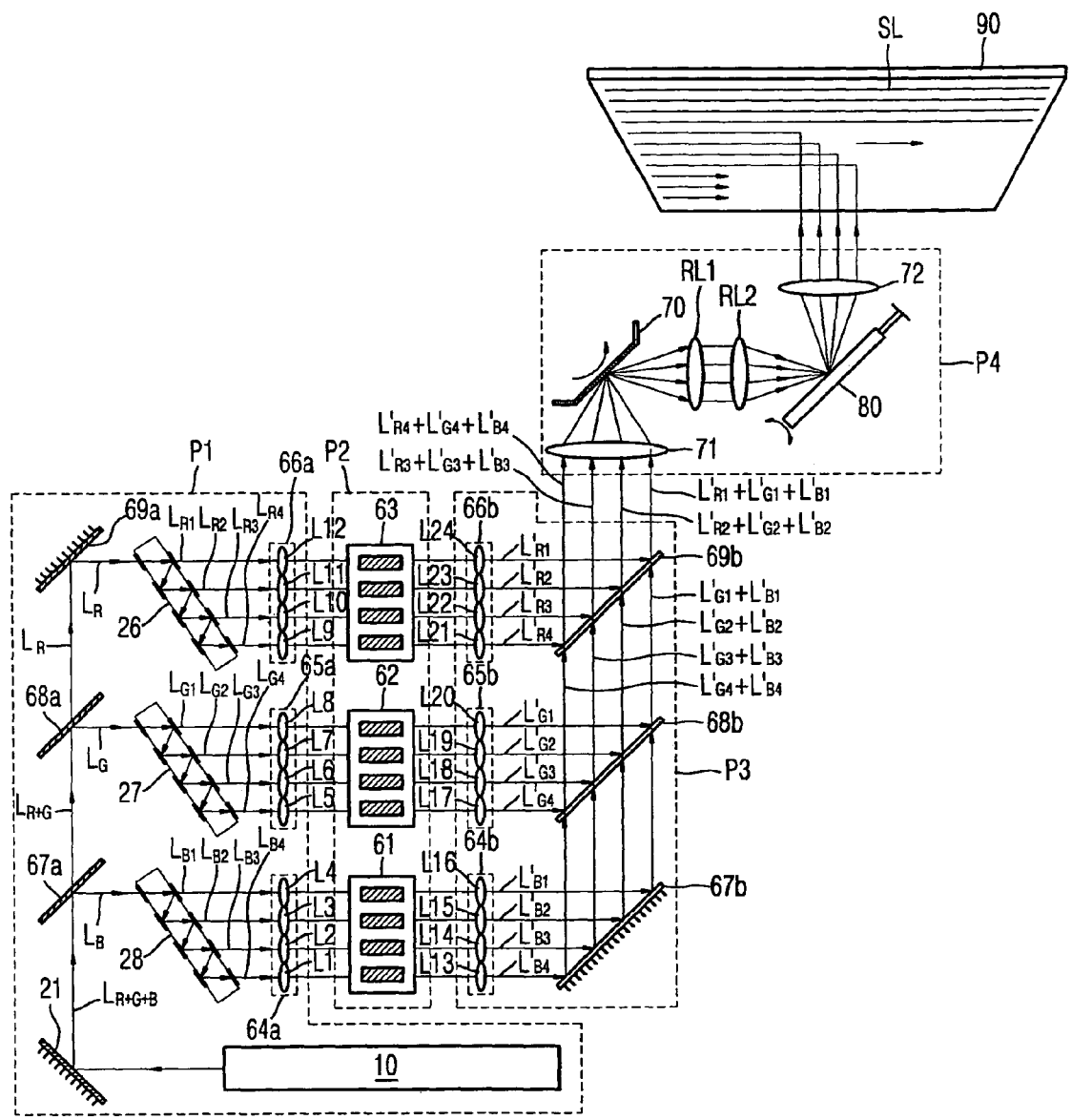
FIG. 3 is a schematic view of a laser video projector according to a first embodiment of the present invention.

As shown in FIG. 3, a laser video projector according to an embodiment of the present invention includes a light generating portion P1, an optic modulator P2, a light combining portion P3, and an optic scanning portion P4. The light generating portion generates red, green, and blue light beams R, G, and B that will be used for displaying a video image from an external input by the light modulation process. The light generating portion P1 generates as many light beams as the number of scan lines to be scanned on a screen 90 at the same time. For example, if there are 4 scan lines to be scanned on the screen 90 at the same time, the light generating portion P1 generates four red light beams, four green light beams, and four blue light beams at the same time. Then, the red, green, and blue video signals R, G, and B separated as many as scan lines (at least two or more) to be scanned at the same time are input to the optic modulator P2. The optic modulator P2 modulates a plurality of red light beams, a plurality of green light beams, and a plurality of blue light beams, at the same time, which are incident from the light generating portion P1 and are focused, using the red, green, and blue video signals R, G, and B. Also, the light combining portion P3 combines the plurality of red light beams, the plurality of green light beams, and the plurality of blue light beams in a predetermined order. For example, in a case where the plurality of red light beams are first through fourth red light beams, the plurality of green light beams are first through fourth light beams, and the plurality of blue light beams are first through fourth light beams, the light combining portion P3 respectively combines the first red, green, and blue light beams, the second red, green, and blue light beams, the third red, green, and blue light beams, and the fourth red, green, and blue light beams. Then, the optic scanning portion P4 scans the combined light beams on the screen 90.

The light generating portion P1 includes a light source 10 to make a video image, first and second optical path changing portions 21 and 69a, and first and second optical transmission/reflection portions 67a and 68a. The first and second optical path changing portions 21 and 69a reflect incident light to change optical paths. The first and second transmission/reflection portions 67a and 68a transmit a portion of the incident light and reflect other portions of the incident light. The light source 10 may be a gas laser emitting white laser light as a laser light source, a gas laser emitting red, green, and blue laser light beams R, G, and B, a solid state laser using a wavelength conversion method, or a semiconductor laser diode. It is preferable that the first and second optical changing portions 21 and 69a are first and second high reflection mirrors. However, the first and second optical changing portions 21 and 69a may be replaced with optical elements that can perform the same function. It is preferable that the first and second transmission/reflection portions 67a and 68a are first and second dichroic mirrors. In an event that the emitted laser light $L_{R+G+B}$ is a white laser light into which red, green, and blue laser light beams are combined, a chromatic correction lens may be used as a collimating lens that collimates laser light $L_{R+G+B}$ emitted between the light source 10 and the first optical path changing portion 21.

The light generating portion P1 includes first, second, and third monochromatic separators 26, 27, and 28 which separates incident monochromatic light, e.g., red light R, green light G, or blue light R, into as many laser light beams, having the same optical power, as the scan lines to be scanned on the screen 900 at the same time.

Figure 4:
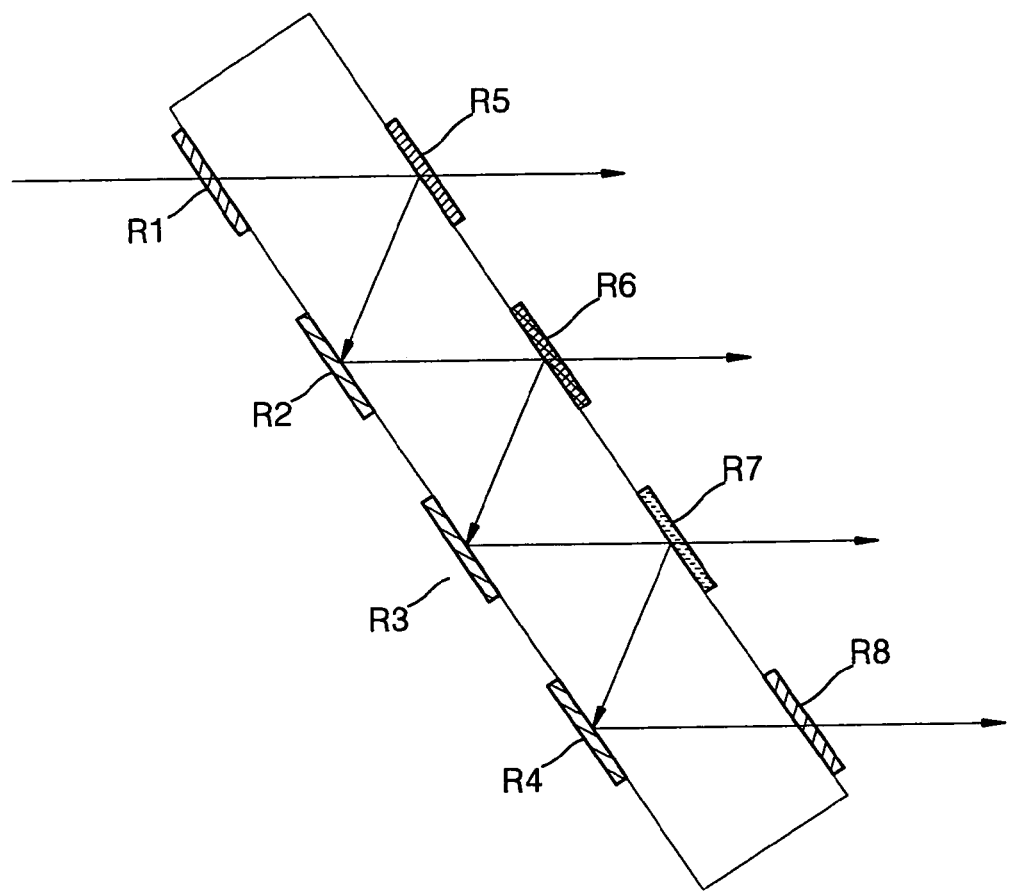
FIGS. 4 and 5 are detailed views for respectively explaining a method for separating laser light using a monochromatic separator included in the laser video projector shown in FIG. 3, according to an embodiment of the present invention.
Figure 5:
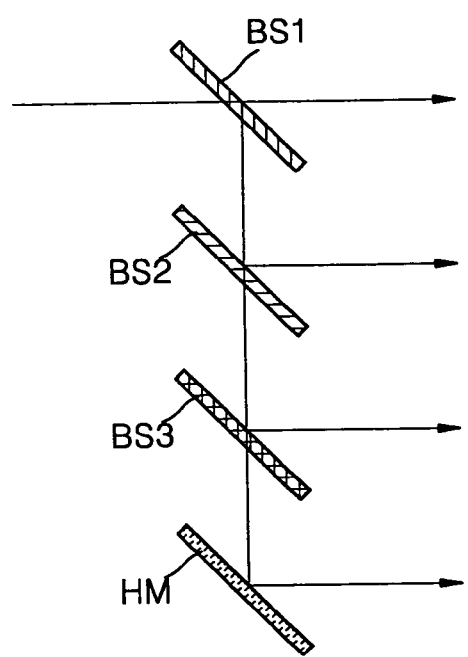

FIGS. 4 and 5 shows respectively embodiments of the first, second, and third monochromatic separators 26, 27, and 28. As seen in FIG. 4, each of the first, second, and third monochromatic separators 26, 27, and 28 may be a transmissible (transparent) plate P that includes a first anti-reflection coating film R1, first, second, and third high reflection coating films R2, R3, and R4, first, second, and third transmission/reflection films R5, R6, and R7, and a second anti-reflection coating film R8. The first anti-reflection coating film R1 transmits more than 99% of light incident on a surface on which the monochromatic light is incident. The first, second, and third high reflection coating films R2, R3, and R4 reflect more than 99% of incident light. The first, second, and third transmission/reflection films R5, R6, and R7 have a predetermined transmissivity and reflectance to transmit a portion of light incident on a surface from which the monochromatic light is emitted and reflect other portions of the light. The second anti-reflection coating film R8 transmits more than 99% of the light reflected by the third high reflection coating film R4.

As described above, it is preferable that the first, second, and third monochromatic separators 26, 27, and 28 separate incident monochromatic light into a plurality of light beams having the same optical power. The monochromatic light is substantially separated by the first, second, and third transmission/reflection films R5, R6, and R7 in the first, second, and third monochromatic separators 26, 27, and 28. Thus, it is preferable that the first, second, and third transmission/reflection films R5, R6, and R7 equally separate the monochromatic light.

In detail, it is preferable that the first transmission/reflection film R5 has a transmissivity of about 25% and a reflectance of about 75% to separate monochromatic light passing through the first anti-reflection coating film R1, i.e., ¼ of red laser light, green laser light, or blue laser light. The second transmission/reflection film R6 faces the first reflection coating film R2 on which 75% (¾) of the monochromatic light is incident from the first transmission/reflection film R5. The second transmission/reflection film R6 transmits ⅓ of 75% (¾) of the monochromatic light incident from the first high reflection coating film R2 and reflects the remaining portions (¾*⅔=6/12=½, 50%) to the second high reflection coating film R3. Thus, it is preferable that the second transmission/reflection film R6 has a transmissivity of 33% and a reflectance of 66.7%. The third transmission/reflection film R7 transmits 25% corresponding to ½ of 50% of the monochromatic light incident from the second high reflection coating film R3 facing the third transmission/reflection film R7. Thus, it is preferable that the third transmission/reflection film R7 has a transmissivity of 50% and a reflectance of 50%. It is preferable that the first, second, and third transmission/reflection films R5, R6, and R7 are multi-layered coating films to have different transmissivities and reflectances.

At least one or more transmission/reflection films that adjust the transmissivity to a separation ratio of the monochromatic light and an anti-reflection coating film having a transmissivity of more than 99% may be placed on a second surface of the transparent plate P. Thus, the monochromatic light may be separated into at least two or more monochromatic light beams having the same optical power.

As shown in FIG. 5, each of the first, second, and third monochromatic separators 26, 27, and 28 may include first, second, and third beam splitters BS1, BS2, and BS3 and a high reflection mirror HM having a reflectance of more than 99%. It is preferable that the first beam splitter BS1 reflects about 75% of the monochromatic light to the second beam splitter BS2 and transmits about 25% of the monochromatic light. It is preferable that the second beam splitter BS2 reflects about 33.3% of 75% light incident from the first beam splitter BS1 and transmits about 66.7% of 75% light. It is preferable that the third beam splitter BS3 reflects 50% of 66.7% light (corresponding to 50% of the monochromatic light) incident from the second beam splitter BS2 and transmits 50% of 66.7% light. It is preferable that the high reflection mirror HM reflects more than 99% of 50% light (corresponding to 25% of the monochromatic light) incident from the third beam splitter BS3. As a result, four light beams having the same optical power are obtained from the first, second, and third beam splitters BS1, BS2, and BS3 and the high reflection mirror HM.

Even in a case where each of the first, second, and third monochromatic separators 26, 27, and 28 includes beam splitters and a high reflection mirror, by using at least one or more beam splitters that adjust the transmissivity to a separation ratio of the monochromatic light and one high reflection mirror having a reflectance of more than 99%, the monochromatic light may be separated into at least two or more monochromatic light beams having the same optical power.

The light generating portion P1 includes first, second, and third groups of lenses 64a, 65a, and 66a that are placed between the first, second, and third monochromatic separators 26, 27, and 28 and the optic modulator P2 and focus light beams incident from the first, second, and third monochromatic separators 26, 27, and 28 on the optic modulator P2. The first, second, and third groups of lenses 64, 65a, and 66a include first, second, third, and fourth micro lenses L1, L2, L3, and L4, fifth, sixth, seventh, and eighth micro lenses L5, L6, L7, and L8, and ninth, tenth, eleventh, and twelfth micro lenses L9, L10, L10, and L12. The first monochromatic separator 26 separates red laser light into first, second, third, and fourth red laser light beams $L_{R1}$, $L_{R2}$, $L_{R3}$, and $L_{R4}$. The second monochromatic separator 27 separates green laser light into first, second, third, and fourth green laser light beams $L_{G1}$, $L_{G2}$, $L_{G3}$, and $L_{G4}$. The third monochromatic separator 28 separates blue laser light into first, second, third, and fourth blue laser light beams $L_{B1}$, $L_{B2}$, $L_{B3}$, and $L_{B4}$. Thus, the first, second, third, and fourth red laser light beams $L_{R1}$, $L_{R2}$, $L_{R3}$, and $L_{R4}$, the first, second, third, and fourth green laser light beams $L_{G1}$, $L_{G2}$, $L_{G3}$, and $L_{G4}$, and the first, second, third, and fourth blue laser light beams $L_{B1}$, $L_{B2}$, $L_{B3}$, and $L_{B4}$ correspond on an one-to-one basis to the first through twelfth micro lenses L1 through L12 and are focused on the optic modulator P2.

Describing the optical path of light in the light generating portion P1, laser light $L_{R+G+B}$ emitted from the light source 10 is reflected to the first light transmission/reflection portion 67a by the first optical path changing portion 21. Colors of the laser light emitted from the first light transmission/reflection portion 67a are separated. A portion (a blue laser light beam $L_B$) of the laser light $L_{R+G+B}$ is reflected to the third monochromatic separator 28 and the other portions (red and green laser light beam $L_{R+G}$) of the laser light $L_{R+G+B}$ are transmitted to the second light transmission/reflection portion 68a. The second light transmission/reflection portion 68a separates the red and green laser light beam $L_{R+G}$. In this process, the green laser light beam $L_G$ is reflected to the second monochromatic separator 27 and the red laser light beam $L_R$ is transmitted to the second optical changing portion 69a. The red laser light beam $L_R$ is reflected to the first monochromatic separator 26 by the second optical path changing portion 69a. The monochromatic light incident on first, second, and third monochromatic separators 26, 27, and 28, i.e., each of red, green, and blue laser light beams $L_R$, $L_G$, and $L_B$, is separated in as many beams as the scan lines scanned on the screen 90 at the same time. For example, in a case where four scan lines are scanned on the screen 90 at the same time, the red, green, and blue laser light beams $L_R$, $L_G$, and $L_B$ are separated into first, second, third, and fourth red, green, and blue laser light beams $L_{R1}$, $L_{R2}$, $L_{R3}$, and $L_{R4}$, $L_{G1}$, $L_{G2}$, $L_{G3}$, and $L_{G4}$, and $L_{B1}$, $L_{B2}$, $L_{B3}$, and $L_{B4}$ by the first, second, and third monochromatic separators 26, 27, and 28. The first, second, third, and fourth red laser light beams $L_{R1}$, $L_{R2}$, $L_{R3}$, and $L_{R4}$ are focused on the optic modulator P2 via the ninth, tenth, eleventh, and twelfth micro lenses L9, L10, L11, and L12 of the third group of lenses 66a. The first, second, third, and fourth green laser light beams $L_{G1}$, $L_{G2}$, $L_{G3}$, and $L_{G4}$ are focused on the optic modulator P2 via the fifth, sixth, seventh, and eighth micro lenses L5, L6, L7, and L8 of the second group of lenses 65a. The first, second, third, and fourth blue laser light beams $L_{B1}$, $L_{B2}$, $L_{B3}$, and $L_{B4}$ are focused on the optic modulator P2 via the first, second, third, and fourth micro lenses L1, L2, L3, and L4 of the first group of lenses 64a.

Figure 6:
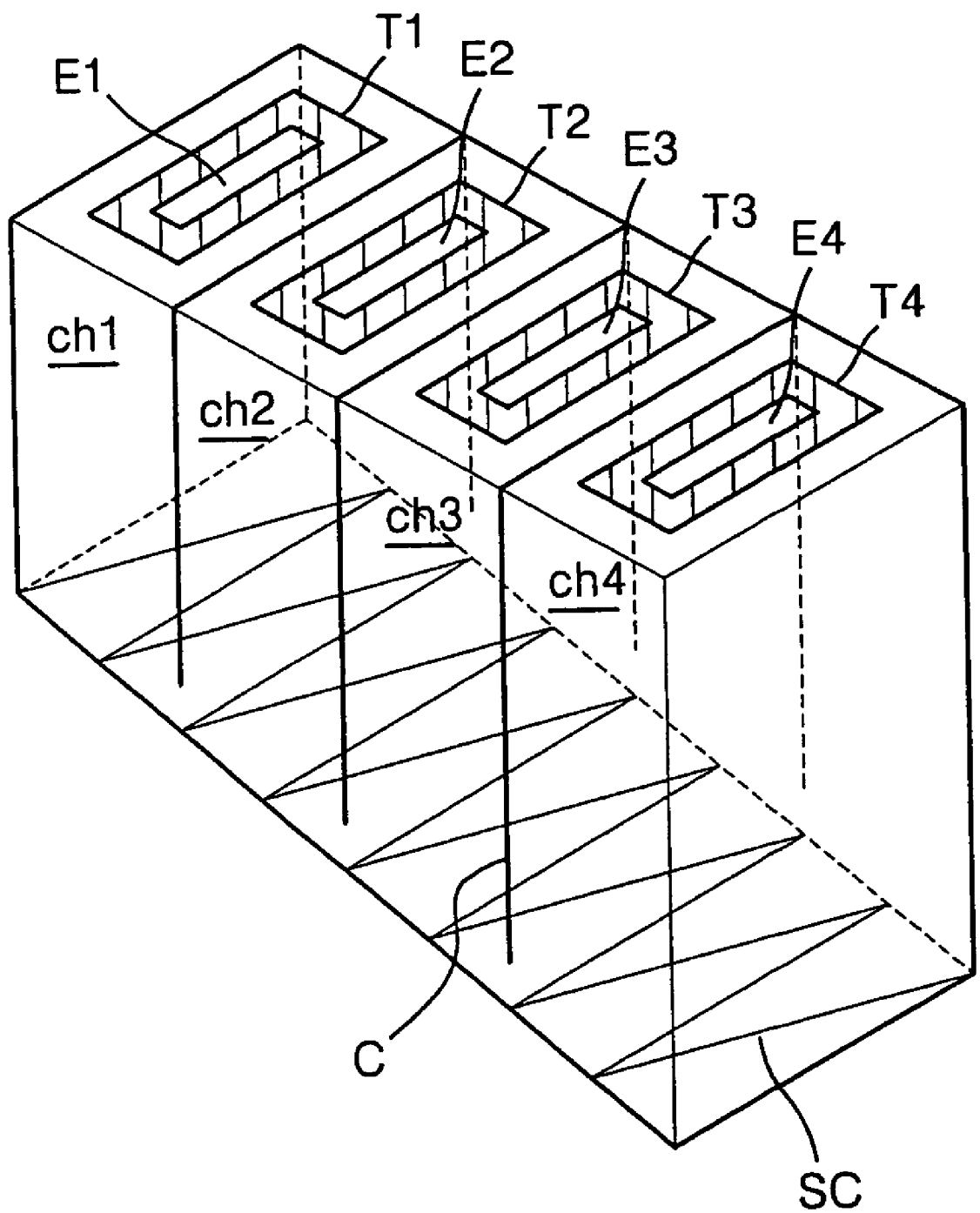
FIG. 6 is an extended view of a multi-channel acousto-optic modulator in the laser video projector shown in FIG. 3.

The optic modulator P2 includes first, second, and third multi-channel acousto-optic modulators 63, 62, and 61. The first multi-channel acousto-optic modulator 63 modulates the first, second, third, and fourth red laser light beams $L_{R1}$, $L_{R2}$, $L_{R3}$, and $L_{R4}$ at the same time. The second multi-channel acousto-optic modulator 62 modulates the first, second, third, and fourth green laser light beams $L_{G1}$, $L_{G2}$, $L_{G3}$, and $L_{G4}$ at the same time. The third multi-channel acousto-optic modulator 61 modulates the first, second, third, and fourth $L_{B1}$, $L_{B2}$, $L_{B3}$, and $L_{B4}$ at the same time. FIG. 6 is an enlarged perspective view of one of the first, second, and third multi-channel acousto-optic modulators 63, 62, and 61. Each of the first, second, and third multi-channel acousto-optic modulators 63, 62, and 61 has four optic modulation channels ch1, ch2, ch3, and ch4 that are made of an optical monocrystalline medium such as tellurium dioxide ($TeO_2$). First, second, third, and fourth transducers T1, T2, T3, and T4 exist on the optic modulation channels ch1, ch2, ch3, and ch4. First, second, third, and fourth electrodes E1, E2, E3, and E4, to which video signals are applied at the same time to be modulated, exist on the first through fourth T1, T2, T3, and T4 transducers. It is preferable that the first, second, third, and fourth transducers T1, T2, T3, T4 are $LiNbO_3$ monocrystalline thin films. It is preferable that the first through fourth electrodes E1 through E4 are formed of metal thin films. Reference character C denotes cuts to a predetermined depth in the optic modulation channels ch1, ch2, ch3, and ch4 of each of the first, second, and third multi-channel acousto-optic modulators 63, 62, and 61. The cuts C are to prevent crosstalk among the optic modulation channels ch1, ch2, ch3, and ch4 during the optical modulation process. A scratch pattern SC to prevent ultrasonic waves generated by the optic modulation channels ch1, ch2, ch3, and ch4 from being reflected is formed to a surface facing the first, second, third, and fourth electrodes E1, E2, E3, and E4 of each of the first, second, and third multi-channel acousto-optic modulators 63, 62, and 61. Alternatively, a material for absorbing the ultrasonic waves may exist on the surface instead of the scratch pattern SC.

In order to modulate the laser light beams incident on the optic modulator P2 at the same time, each of the first, second, and third multi-channel acousto-optic modulators 63, 62, and 61 has four optic modulation channels, a number identical to the number of the scan lines scanned on the screen 90 at the same time. For example, the first multi-channel acousto-optic modulator 63 has first through fourth optic modulation channels to modulate the first, second, third, and fourth laser light beams $L_{R1}$, $L_{R2}$, $L_{R3}$, and $L_{R4}$ at the same time.

The simultaneous modulation of laser light beams incident on the first, second, and third multi-channel acousto-optic modulators 63, 62, and 61 is achieved by color video signals applied to the first, second, and third multi-channel acousto-optic modulators 63, 62, and 61. In other words, when the first, second, third, and fourth red laser light beams $L_{R1}$, $L_{R2}$, $L_{R3}$, and $L_{R4}$ are focused on the first through fourth optic modulation channels of the first multi-channel acousto-optic modulator 63, red video signals are applied to the first through fourth optic modulation channels. Thus, the first, second, third, and fourth red laser light beams $L_{R1}$, $L_{R2}$, $L_{R3}$, and $L_{R4}$ passing through the first through fourth optic modulation channels are modulated at the same time. The first, second, third, and fourth green laser light beams $L_{G1}$, $L_{G2}$, $L_{G3}$, and $L_{G4}$ and the first, second, third, and fourth blue laser light beams $L_{B1}$, $L_{B2}$, $L_{B3}$, and $L_{B4}$ are modulated using the same modulation process except the different color video signals.

Instead of the first, second, and third multi-channel acousto-optic modulators 63, 62, and 61, the optic modulator P2 may include one multi-channel acousto-optic modulator having all of optic modulation channels of the first, second, and third multi-channel acousto-optic modulators 63, 62, and 61.

Figure 7:
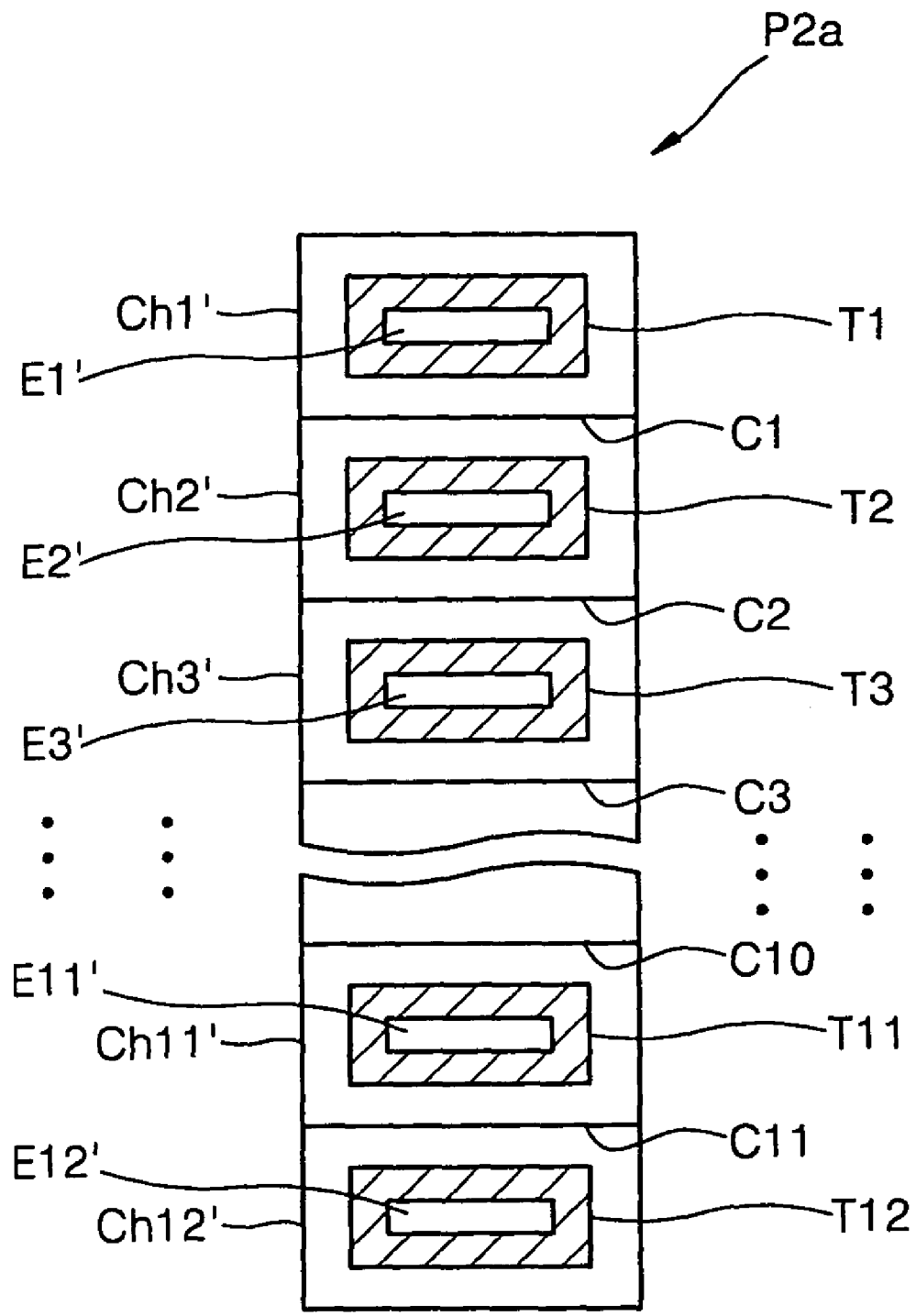
FIG. 7 is a plan view of a multi-channel acousto-optic modulator in the laser video projector shown in FIG. 3 according to an embodiment of the present invention.

FIG. 7 illustrates a multi-channel optic modulator P2a having first through twelfth channels ch1' through ch12'. The first through fourth channels ch1' through ch4' of the first through twelfth channels ch1' through ch12' modulate the first, second, third, and fourth red laser light beams $L_{R1}$, $L_{R2}$, $L_{R3}'$, and $L_{R4}'$. The fifth through eighth channels ch5' through ch8' modulate the first, second, third, and fourth green laser light beams $L_{G1}$, $L_{G2}$, $L_{G3}$, and $L_{G4}$. The ninth through twelfth channels ch9' through ch12' modulate the first, second, third, and fourth blue laser light beams $L_{B1}$, $L_{B2}$, $L_{B3}$, and $L_{B4}$. When laser light beams to be modulated are applied to the first through twelfth channels ch1' through ch12', red video signals are simultaneously applied to electrodes E1', E2', E3', and E4' of the first through fourth channels ch1' through ch4', green video signals are simultaneously applied to the fifth through eighth channels ch5' through ch8', and blue video signals are simultaneously applied to the ninth through twelfth channels ch9' through ch12'. Reference characters C1 through C11 denote cuts to a predetermined depth in the first through twelfth channels ch1' through ch12', respectively. Reference characters T1 through T12 denote first through twelfth transducers and E1' through E12' denote first through twelfth electrodes.

The optic combining portion P3, in which modulated laser light beams that pass through the channels of the optic modulator P2 using the applied video signals are combined, includes fourth, fifth, and sixth groups of lenses 64b, 65b, and 66b, the third optical path changing portion 67b, the third light transmission/reflection portion 68b, and the fourth light transmission/reflection portion 69b. The fourth, fifth, and sixth groups of lenses 64b, 65b, and 66b one-to-one correspond to the first, second, and third multi-channel acousto-optic modulators 63, 62, and 61 of the optic modulator P2. The third optical path changing portion 67b reflects blue laser light beams $L_{B1}'$, $L_{B2}'$, $L_{B3}'$, and $L_{B4}'$, which are modulated and incident from the fourth group of lenses 64b, toward the optic scanning portion P4. The third light transmission/reflection portion 68b reflects green laser light beams $L_{G1}'$, $L_{G2}'$, $L_{G3}'$, and $L_{G4}'$, which are modulated and incident from the fifth group of lenses 65b, toward the optic scanning portion P4 and transmits the blue laser light beams $L_{B1}'$, $L_{B2}'$, $L_{B3}'$, and $L_{B4}'$ incident from the third optical path changing portion 67b. The fourth light transmission/reflection portion 69b reflects red laser light beams $L_{R1}'$, $L_{R2}'$, $L_{R3}'$, and $L_{R4}'$, which are modulated and incident from the sixth group of lenses 66b, toward the optic scanning portion P4 and transmits laser light beams $L_{R1}'+L_{B1}'$, $L_{R2}'+L_{B2}'$, $L_{R3}'+L_{B3}'$, and $L_{R4}'+L_{B4}'$ incident form the third light transmission/reflection portion 68b.

The third optical path changing portion 67b is the third high reflection mirror. The third and fourth light transmission/reflection portions 68b and 69b are respectively the third dichroic mirror, which has very low transmissivity with respect to green light and very high transmissivity with respect to blue light and the fourth dichroic mirror, which has very low transmissivity with respect to red light and very high transmissivity with respect to green light and red light. The fourth, fifth, and sixth groups of lenses 64b, 65b, and 66b change laser light beams incident form the optic modulator P2 to parallel laser light beams. For this, each of the fourth, fifth, and sixth groups of lenses 64b, 65b, and 66b includes four micro lenses. Thirteenth through sixteenth micro lenses L13 through L16 of the fourth group of lenses 64b one-to-one correspond to four channels of the third multi-channel acousto-optic modulator 61. Seventeenth through twentieth micro lenses L17 through L20 of the fifth group of lenses 65b correspond on a one-to-one basis to four channels of the second multi-channel acousto-optic modulator 62. Twenty first through twenty fourth micro lenses L21 through L24 of the sixth group of lenses 66b correspond on a one-to-one basis to four channels of the first multi-channel acousto-optic modulator 63.

The optical paths of modulated laser light beams incident from the optic modulator P2 to the optic combining portion P3, modulated red, green, and blue laser light beams $L_{R1}'$, $L_{R2}'$, $L_{R3}'$, and $L_{R4}'$, $L_{G1}'$, $L_{G2}'$, $L_{G3}'$, and $L_{G4}'$, and $L_{B1}'$, $L_{B2}'$, $L_{B3}'$, and $L_{B4}'$ incident from twelve channels of the first, second, and third multi-channel acousto-optic modulators 63, 62, and 61 are changed to parallel laser light beams via twelve micro lenses L24, L23, ... L14, and L13 of the sixth, fifth, and fourth groups of lenses 66b, 65b, and 64b. The modulated blue laser light beams $L_{B1}'$, $L_{B2}'$, $L_{B3}'$, and $L_{B4}'$ passing through the thirteenth through sixteenth micro lenses L13 through L16 of the fourth group of lenses 64b are reflected by the third optical path changing portion 67b and transmitted to the optic scanning portion P4 through the third and fourth light transmission/reflection portions 68b and 69b. In this process, the modulated blue laser light beams $L_{B1}'$, $L_{B2}'$, $L_{B3}'$, and $L_{B4}'$ are respectively combined with modulated green laser light beams $L_{G1}'$, $L_{G2}'$, $L_{G3}'$, and $L_{G4}'$ which are transmitted through the third light transmission/reflection portion 68b and reflected to the fourth light transmission/reflection portion 69b by the third light transmission/reflection portion 68b. The combined laser light beams $L_{G1}'+L_{B1}'$, $L_{G2}'+L_{B2}'$, $L_{G3}'+L_{B3}'$, and $L_{G4}'+L_{B4}'$ are combined with modulated red laser light beams $L_{R1}'$, $L_{R2}'$, $L_{R3}'$, and $L_{R4}'$, which are transmitted through the fourth light transmission/reflection portion 69b and reflected to the optic scanning portion P4 by the fourth light transmission/reflection portion 69b. The combined laser light beams $L_{R1}'+L_{G1}'+L_{B1}'$, $L_{R2}'+L_{G2}'+L_{B2}'$, $L_{R3}'+L_{G3}'+L_{B3}'$, and $L_{R4}'+L_{G4}'+L_{B4}'$ correspond to one scan line, containing red, green, and blue colors, scanned on the screen 90. Thus, four combined laser light beams $L_{R1}'+L_{G1}'+L_{B1}'$, $L_{R2}'+L_{G2}'+L_{B2}'$, $L_{R3}'+L_{G3}'+L_{B3}'$, and $L_{R4}'+L_{G4}'+L_{B4}'$ corresponding to four scan lines are simultaneously incident on the optic scanning portion P4 from the optic combining portion P3.

The optic scanning portion P4 includes a first focusing lens 71, a first scanner 70, second scanner 80, a first relay lens RL1, a second relay lens RL2, and a second focusing lens 72. The first focusing lens 71 focuses four combined laser light beams $L_{R1}'+L_{G1}'+L_{B1}'$, $L_{R2}'+L_{G2}'+L_{B2}'$, $L_{R3}'+L_{G3}'+L_{B3}'$, and $L_{R4}'+L_{G4}'+L_{B4}'$. The first scanner 70 periodically reflects light focused by the first focusing lens 71 to horizontally scan the focused light on the screen 90. The second scanner 80 scans the light incident from the first scanner 71 on the screen 90 and determines the vertical position of the incident light to be scanned. The first and second relay lenses RL1 and RL2 are positioned in an optical path between the first and second scanners 70 and 80 so that the light reflected by the first scanner 70 is focused on the second scanner 80. The second focusing lens 72 is placed between the screen 90 and the second scanner 80 to control distances among a plurality of scan lines that are scanned on the screen 90 from the second scanner 80. Reference character SL denotes the scan lines.

The first and second relay lenses RL1 and RL2 focus the horizontally scanned light by the first scanner 70 so that the horizontally scanned light is incident within a range of the effective area of the second scanner 80 to be vertically scanned. It is preferable that the first scanner 70 is a polygon mirror and the second scanner 80 is a galvanometer. However, the first and second scanners 70 and 80 may be replaced with optical elements that perform the same function. It is preferable that the first and second focusing lenses 71 and 72 and the first and second relay lenses RL1 and RL2 are convex lenses.

Figure 8:
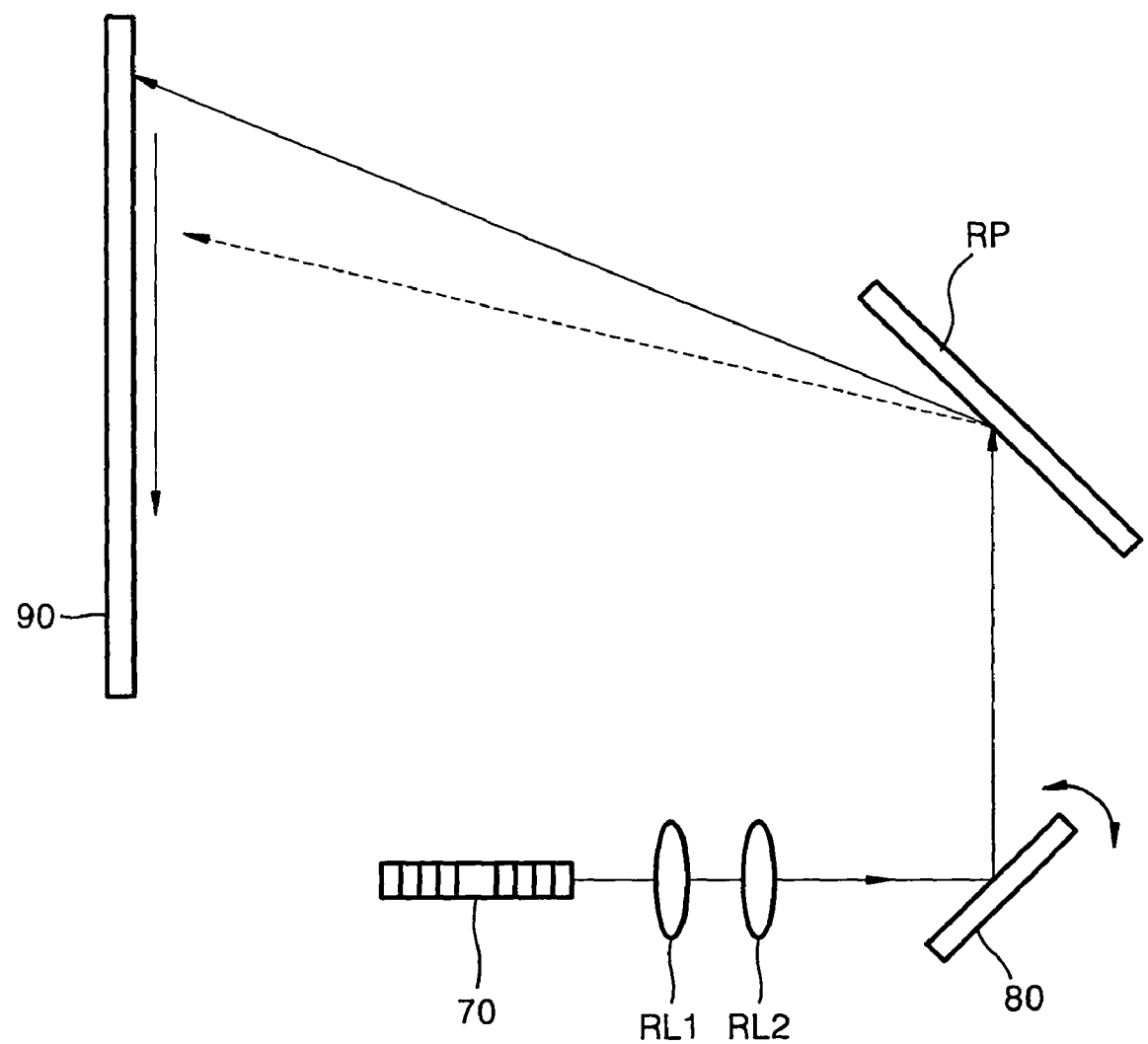
FIG. 8 is a perspective view of a modified optical scanner in the laser video projector shown in FIG. 3.

As shown in FIG. 8, the optic scanning portion P4 may include first and second scanners 70 and 80, first and second relay lenses RL1 and RL2, and a reflector plate RP that projects light incident from the second scanner 80 toward the screen 90 above the second scanner 80.

In a laser video projector according to a second embodiment, a light source portion includes a plurality of first light sources emitting red laser light, a plurality of second light sources emitting green laser light, and a plurality of third light sources emitting blue laser light. Light is transmitted from the light source portion to an optic modulator. The modulated light is transmitted from the optic modulator to an optic scanning portion using optical fibers. Thus, the laser video projector according to the second embodiment of the present invention is different from the laser video projector according to the first embodiment of the present invention in that its size is reduced.

The same elements of the laser video projector according to the second embodiment of the present invention as those of the laser video projector according to the first embodiment of the present invention are assigned identical reference numerals (characters). Thus, the descriptions of these elements will not be repeated here.

Figure 9:
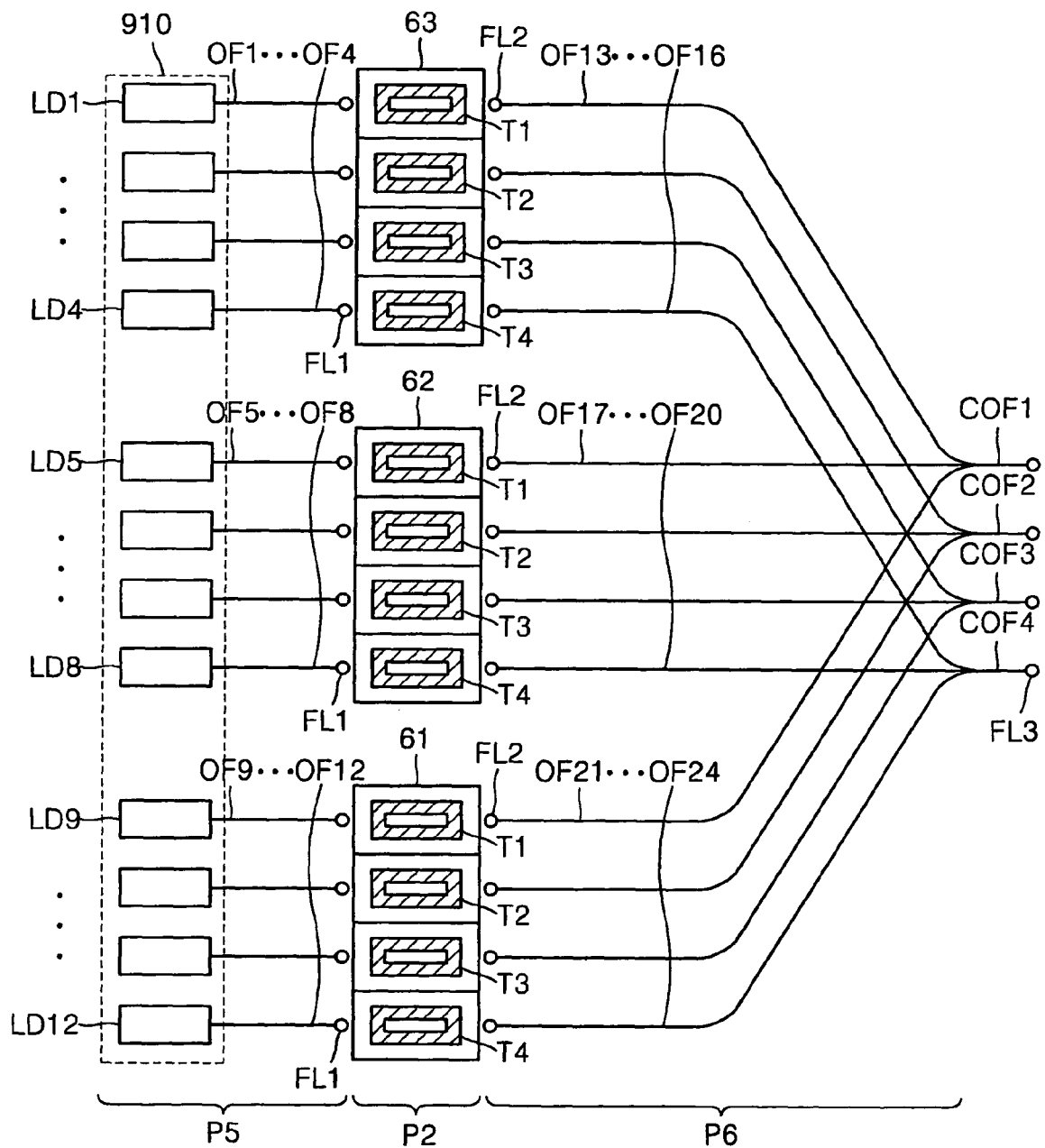
FIG. 9 is a schematic view of a laser video projector according to an embodiment of the present invention.

Referring to FIG. 9, the laser video projector according to the second embodiment of the present invention includes a light generating portion P5, an optic modulator P2, an optic combining portion P6, an optic scanning portion P4, and a screen 90. The light generating portion P5 generates light to be used to project a video image, e.g., laser light. The optic modulator P2 modulates light generated by the light generating portion P5. The optic combining portion P6 combines light beams emitted from the optic modulator P2 via predetermined channels. The optic scanning portion P4 scans the combined light beams on the screen 90 to display a video image.

The light generating portion P5 includes first through fourth light sources LD1 through LD4 emitting red laser light, fifth through eighth light sources LD5 through LD8 emitting green laser light, and ninth through twelfth light sources LD9 through LD12 emitting blue laser light. The light generating portion P5 also includes twelve optical fibers OF1 through OF12 corresponding on a one-to-one basis to the first through twelfth light sources LD1 through LD12 to transmit monochromatic laser light beams emitted from the first through twelfth light sources LD1 through LD12 to the optic modulator P2. First micro focusing lenses FL1 correspond on a one-to-one basis to the first through twelfth optical fibers OF1 through OF12 to focus monochromatic light beams emitted to the other ends of the optical fibers OF1 through OF12 on a predetermined position of the optic modulator P2. The first micro focusing lenses FL1 correspond on a one-to-one basis to twelve channels of first, second, and third multi-channel acousto-optic modulators 63, 62, and 61 of the optic modulator P2. Thus, four red light beams, four green light beams, and four blue light beams emitted from the first through twelfth light sources LD1 through LD12 are transmitted near to the optic modulator P2 via the optical fibers OF1 through OF12 and then focused on twelve channels of the optic modulator P2 by the first focusing lenses FL1.

As described above, the first micro focusing lenses FL1 perform the same functions as the first, second, and third groups of lenses 64a, 65a, and 66a. By using the first micro focusing lenses FL1, the size of the laser video projector can be greatly reduced.

A process of modulating, the red, green, and blue light beams focused on the optic modulator P2 is identical to the process described in the previous embodiment. As in the previous embodiment, the optic modulator P2 may include one multi-channel acousto-optic modulator having twelve optic modulation channels shown in FIG. 7.

In the optic modulator P5 having the above-described structure, it is preferable that the first through twelfth light sources LD1 through LD12 are semiconductor laser diodes that are formed using a semiconductor manufacturing process. However, the first through twelfth light sources LD1 through LD12 may be different types of laser diodes that emit red, green, and blue laser light beams to be used to project a video image.

The semiconductor laser diodes or optical fibers have a size smaller than the first and second optical path changing portions 21 and 69a, the first and second light transmission/reflection portions 67a and 68a, and the first, second, and third monochromatic separators 26, 27, and 28 described in the previous embodiment. The laser video projector according to the present embodiment is smaller than the laser video projector according to the previous embodiment.

The optic combining portion P6 includes second micro focusing lenses FL2 corresponding on a one-to-one basis to twelve channels of the optic modulator P2 to focus modulate red, green, and blue laser light beams emitted from the channels of the optic modulator P2. The optic combining portion P6 also includes twelve optical fibers OF12 through OF24 to transmit modulated laser light beams emitted from the optic modulator P2 to the optic scanning portion P4. The thirteenth through sixteenth optical fibers OF13 through OF16 transmit modulated red laser light beams, the seventeenth through twentieth optical fibers OF17 through OF20 transmit modulated green laser light beams, and the twenty first through twenty fourth optical fibers OF21 through FO24 transmit modulated blue laser light beams. The second micro focusing lenses FL2 are attached to respective ends of the thirteenth through twenty fourth optical fibers OF13 through OF24 which receive the modulated red, green, and blue laser light beams. While advancing toward the optic scanning portion P4, the twelve optical fibers OF13 through 24 are combined into four optical fibers COF1, COF2, COF3, and COF4. In other words, the thirteenth, seventeenth, and twenty first optical fibers OF13, OF17, and OF21 are combined into the first optical fiber COF1. The fourteenth, eighteenth, and twenty second optical fibers OF14, OF18, and OF22 are combined into the second optical fiber COF2. The fifteenth, nineteenth, and twenty third optical fibers OF15, OF19, and OF23 are combined into the third optical fiber COF3. The sixteenth, twentieth, and twenty fourth optical fibers OF16, OF20, and OF24 are combined into the fourth optical fiber COF4. Ends of the first through fourth optical fibers COF1 through COF4 are polished in order to attach lenses to the ends. Three optical fibers of each of the first through fourth optical fibers COF1 through COF4 are optical paths through which modulated red, green, and blue laser light beams are transmitted from the optic modulator P2 using video signals. Thus, laser light beams transmitted through the first through fourth optical fibers COF1 through COF4 are combined with laser light beams containing the modulated red, green, and blue laser light beams. The first through fourth optical fibers COF1 through COF4 are channels through which videos including red, green, and blue video signals, mixed in a predetermined ratio to be scanned on a screen are transmitted. In other words, the first through fourth optical fibers COF1 through COF4 are channels through which videos to be scanned on the screen 90 are transmitted. Laser light beams transmitted through the first through fourth optical fibers COF1 through COF4 are simultaneously scanned on the screen 90 via the optic modulator P4 presented in the first embodiment. Thus, four scan lines are scanned on the screen 90 at the same time. The resolution of a video image projected on the screen 90 increases as much as the number of scan lines simultaneously scanned on screen 90. In the present invention, the resolution of a video can increase four times compared with the prior art. Third micro focusing lenses FL3 are attached to ends of the first through fourth optical fibers COF1 through COF4. Due to the third micro focusing lenses FL3, laser light beams transmitted through the first through fourth optical fibers COF1 through COF4 are parallel incident on the first focusing lens 71 of the optic scanning portion P4 via the third micro focusing lenses FL3. A process of scanning the incident laser light beams on the screen 90 via the optic scanning portion P4 is the same as that described in the previous embodiment.

A laser video projector according to another embodiment has a structure simpler than the laser video projector according to the second embodiment because a light generating portion does not have optical fibers. The laser video projector according to the present invention includes an optic modulator, an optic combining portion, and an optic scanning portion, the structures of which are the same as those of the optic modulator, the optic combining portion, and the optic scanning portion described in the first part of the description of the present invention. Thus, only the light generating portion will be described in this embodiment. Also, in the drawings, the optic modulator, the optic combining portion, and the optic scanning portion are represented as blocks and a screen of the projector is not shown.

Figure 10:
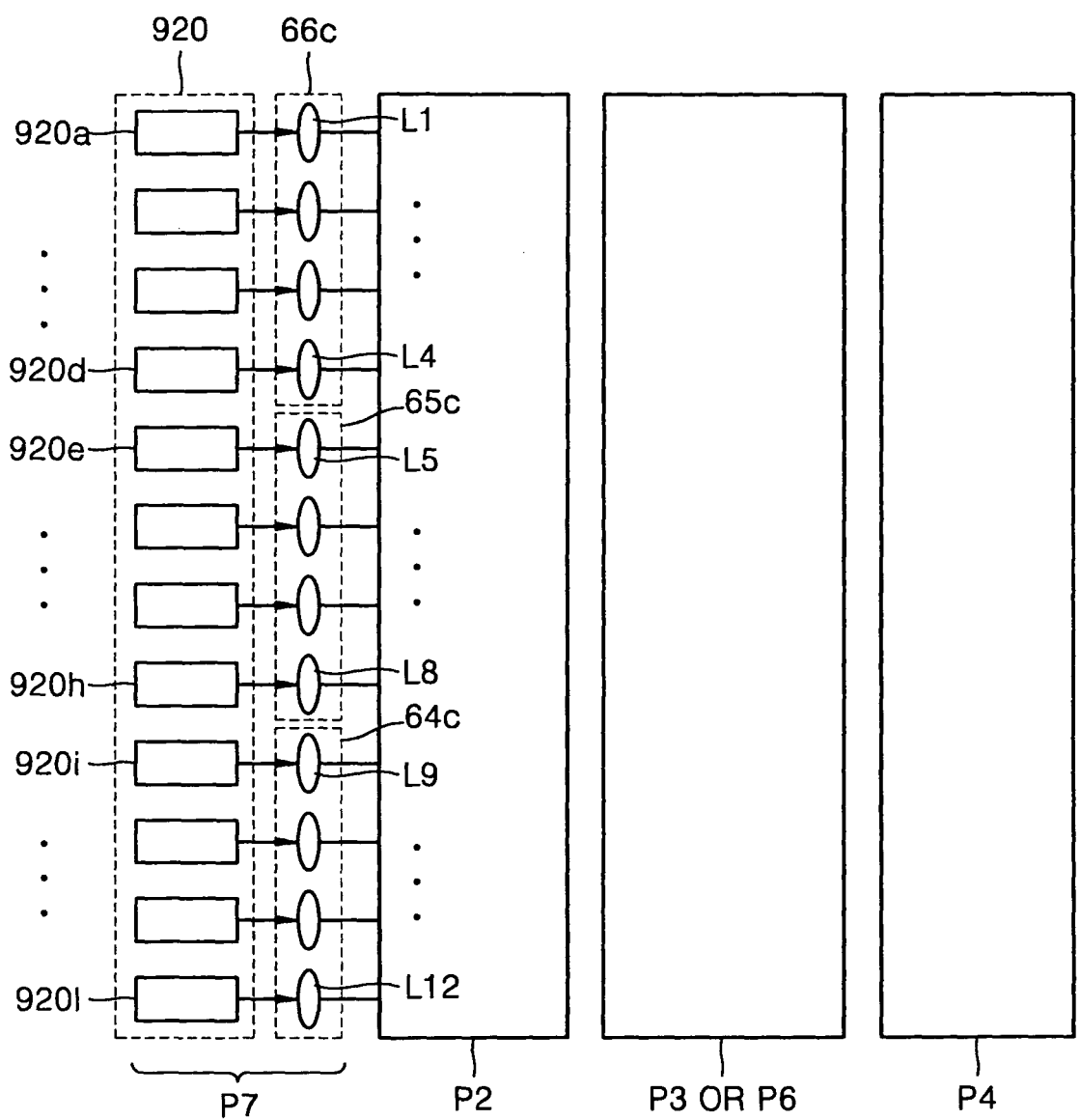
FIG. 10 is a cross-sectional view of the configuration of a laser video projector according to an embodiment of the present invention.

In detail, referring to FIG. 10, a light generating portion P7 of the laser video projector according to a third embodiment of the present invention includes a light source portion 920 and seventh, eighth, and ninth groups of lenses 64c, 65c, and 66c. The light source portion 920 emits red laser light, green laser light, and blue laser light. The seventh, eighth, and ninth groups of lenses 64c, 65c, and 66c are close to the optic modulator P2 to focus laser light beams emitted from the light source portion 920 on channels of the optic modulator P2. Like the light source portion 910 described in the previous embodiment, the light source portion 920 includes four red laser emitting sources 920a, 920b, 920c, and 920d, four green laser emitting sources 920e, 920f, 920g, and 920h, and four blue laser emitting sources 920i, 920j, 920k, and 920l. It is preferable that the red, green, and blue laser emitting sources 920a through 920l are semiconductor laser diodes. The seventh, eighth, and ninth groups of lenses 64c, 65c, and 66c are equal to the first, second, and third groups of lenses 64a, 65a, and 66a described in the first embodiment. In other words, the seventh, eighth, and ninth groups of lenses 64c, 65c, and 66c have twelve micro lenses L1 through L12. The twelve micro lenses L1 through L12 correspond on a one-to-one basis to the red, green, and blue laser emitting sources 920a through 920l constituting the light source portion 920. It is preferable that the laser emitting sources 920a through 920l are close to the micro lenses L1 through L12 to increase the efficiency for focusing red, green, and blue laser light beams emitted from the laser emitting sources 920a through 920l on twelve channels of the optic modulator P2 via the micro lenses L1 through L12.

Figure 11:
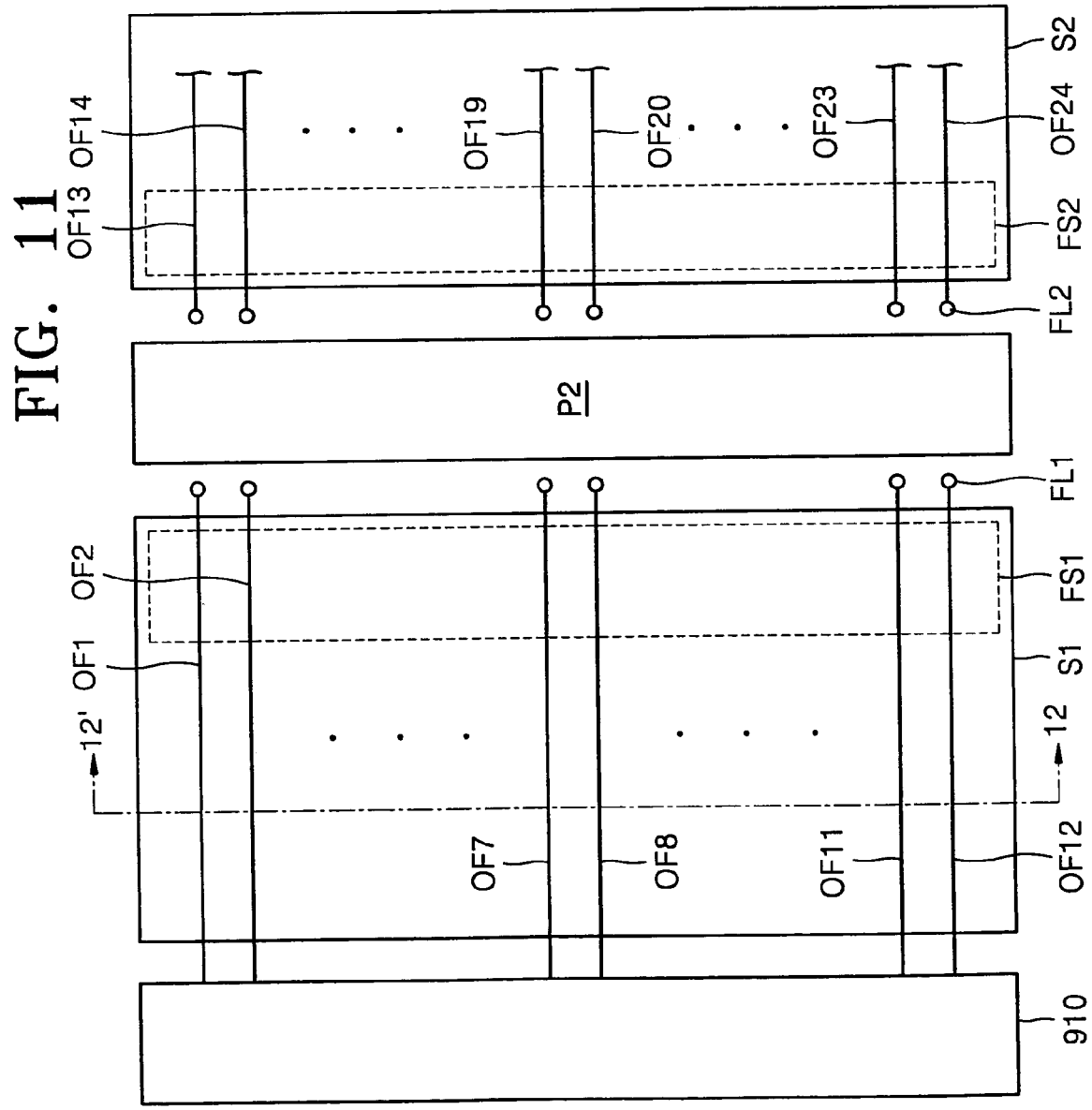
FIG. 11 is a plan view of the arrangement stages on which optical fibers are arranged in the laser video projector according to an embodiment of the present invention.

In the previous and present embodiments, the optical fibers of the optic modulator P5 or P7 or the optical fibers OF13 through OF24 of the optic combiner P6 and the first through fourth optical fibers COF1 through COF4 may be linear or curvilinear. However, it is preferable that the optical fibers of the optic modulator P5 or P7 or the optical fibers OF13 through OF24 of the optic combiner P6 and the first through fourth optical fibers COF1 through COF4 are constituted so that laser light beams emitted from the optical fibers are accurately focused on predetermined channels of the optic modulator P2 and modulated laser light beams emitted from the channels of the optic modulator P2 are accurately focused on predetermined optical fibers of the optic combiner P6. For this, as shown in FIG. 11, the laser video projector according to the previous embodiment may further include first, second, and third arrangement stages S1, S2, and S3 for arranging twelve optical fibers OF1 through OF12 of the light generating portion P5, twelve optical fibers OF13 through OF24 of the optic combining portion P6, and four optical fibers COF1 through COF4. In this case, on the first, second, and third arrangement stages S1, S2, and S3, only minimum portions of the optical fibers may be arranged. For example, as on a first virtual arrangement state FS1, on the first arrangement state S1, only predetermined lengths of the total lengths of the optical fibers OF1 through OF12, including portions to which the first micro focusing lenses FL1 are attached, may be arranged. As on a second virtual arrangement state FS2, on the second arrangement state S2, only predetermined lengths of the total lengths of the optical fibers OF13 through OF24, including portions to which the second micro focusing lenses FL2 are attached, may be arranged. As on a third virtual arrangement stage FS3, on the third arrangement stage S3, only predetermined lengths of the total lengths of the first through fourth optical fibers COF1 through COF4, including portions to which the third micro focusing lenses FS3 are attached, may be arranged.

Figure 12:
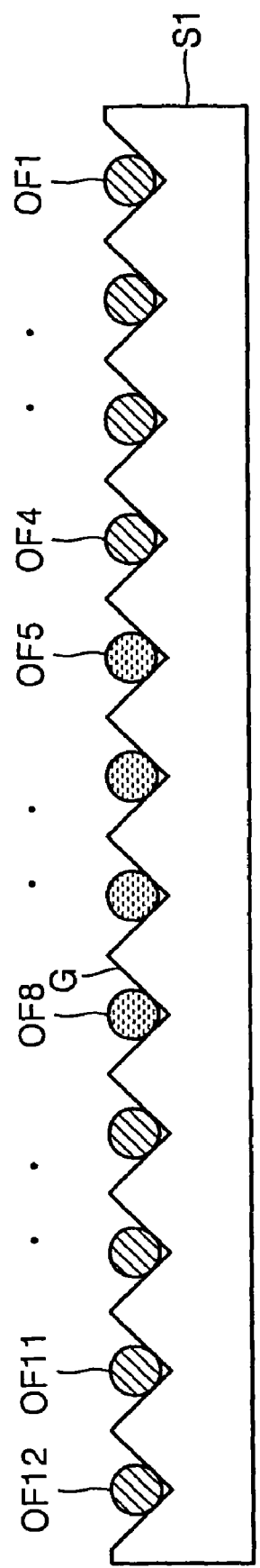
FIG. 12 is a cross-sectional view taken along line 12-12' of FIG. 11.

FIG. 12 is a cross-sectional view taken along line 12-12' of FIG. 11. Referring to FIG. 12, on the surface of the first arrangement state S1, a plurality of V-shaped grooves G are formed to arrange the optical fibers OF1 through OF12 therein. The cross-section of the first arrangement stage S1 may be used to describe cross-sections of the second and third arrangement stages S2 and S3.

In the laser video projector, the resolution of a video image projected on the screen 90 depends on the horizontally scanning speed of the first optic scanner 70 and video processing speeds of the first, second, and third multi-channel acousto-optic modulators 63, 62, and 61. When video signals are processed at the same time by using the first, second, and third multi-channel acousto-optic modulators 63, 62, and 61 each having four channels, each of the first, second, and third multi-channel acousto-optic modulators 63, 62, and 61 processes video signals at a speed of ¼ times. Also, since the optic scanner 70 scans four scan lines at the same time, the first optic scanner 70 should be driven at a scanning speed corresponding to ¼ of the speed for scanning one scan line. The video processing speeds can be adjusted by dividing a horizontal synchronization signal into 4 signals and then applying the divided horizontal synchronization signals.

A method for driving the laser video projectors according to the first through third embodiments will be described.

An analog signal input to a laser video projector is converted into a digital signal via an analog/digital (A/D) converter. The converted digital signal is stored in a FIFO memory and then converted into an analog signal via a digital/analog (D/A) converter. The converted analog signal is applied to a drive for driving an optic modulator, and thus laser light focused on the optic modulator is modulated. Here, if the optic modulator is a multi-channel acousto-optic modulator having at least two or more channels as described above, a video signal input via the A/D converter is processed by using as many FIFO memories as the horizontal scan lines to be simultaneously scanned and the D/A converter.

Figure 13:
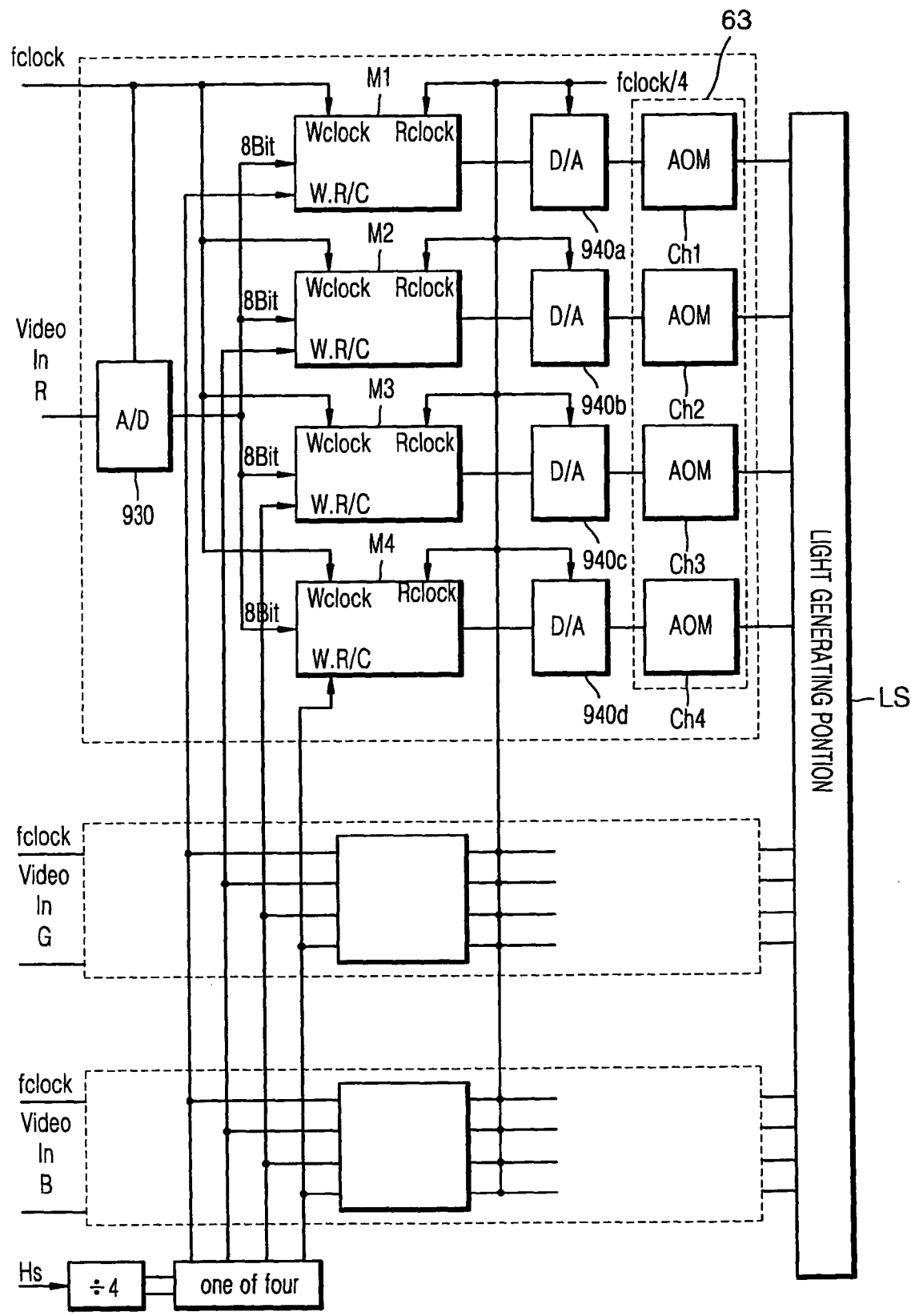
FIG. 13 is a circuit diagram illustrating circuit and method for driving the laser video projector shown in FIGS. 3, 9, and 10.

FIG. 13 is a circuit diagram illustrating a method and circuit for driving the laser video projector according to the present invention. Here, each of the first, second, and third multi-channel acousto-optic modulators 63, 62, and 61 has four optic modulation channels. In each of the first, second, and third multi-channel acousto-optic modulators 63, 62, and 61 having four optic modulation channels, the same modulation process is performed. Thus, for convenience, FIG. 13 shows only a portion related to the first multi-channel acousto-optic modulator 63 on which red laser light is incident. Portions related to the second and third multi-channel acousto-optic modulators 62 and 61 are shown as simple blocks.

Referring to FIG. 13, video signals R input to an A/D converter 930 are written in a memory having a plurality of FIFO memories. In other words, the video signals R are sequentially written in first, second, and third FIFO memories M1, M2, and M3 by using a horizontal synchronization signal Hs that is divided into four portions and then applied. After video signals corresponding to three scan lines are completely input to the first, second, and third FIFO memories M1, M2, and M3, a video signal corresponding to a fourth scan line is written in a fourth FIFO memory M4, and simultaneously, video signals corresponding to four scan lines are read from the first, second, third, and fourth FIFO memories M1, M2, M3, and M4 at a speed that is four times lower than the speed for inputting signals to the first, second, third, and fourth FIFO memories M1, M2, M3, and M4. The read video signals are respectively transmitted to first, second, third, and fourth D/A converters 940a, 940b, 940c, and 940d connected on a one-to-one basis to the first, second, third, and fourth FIFO memories M1, M2, M3, and M4. The transmitted video signals are simultaneously applied to four channels ch1, ch2, ch3, and ch4 in the first multi-channel acousto-optic modulator 63. Thus, laser light beams simultaneously incident on the four channels ch1, ch2, ch3, and ch4 from a light generating portion LS are modulated at the same time. The modulated laser light beams are scanned at a time on a screen by using an optic scanner so that a video image having a high resolution can be obtained.

Figure 14:
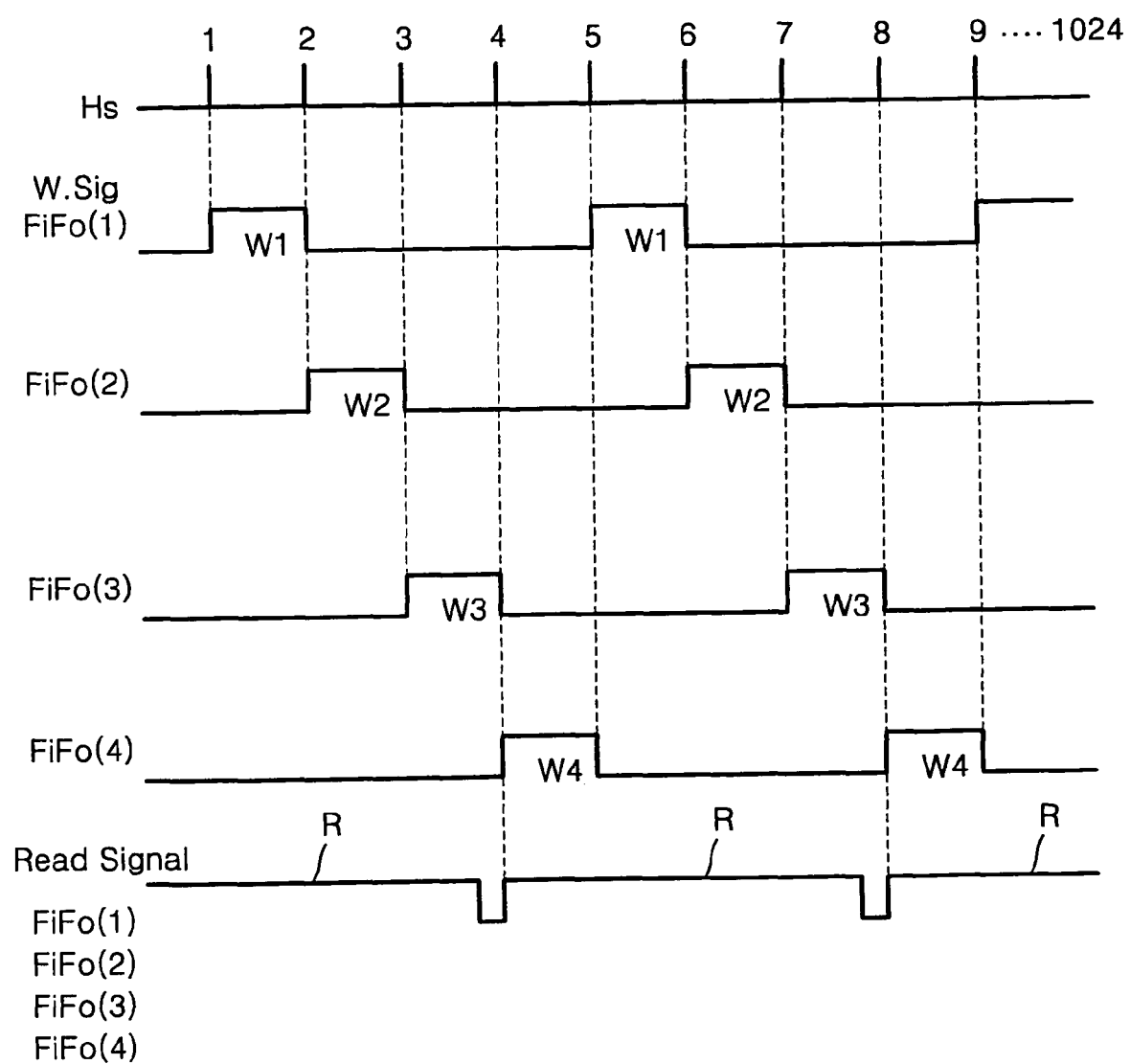
FIG. 14 is a view illustrating write/read clock signals applied to channels in the block diagram shown in FIG. 13.

FIG. 14 shows write clock signals used to store video information in the first, second, third, and fourth FIFO memories M1, M2, M3, and M4 and a read clock signal used to read video information from the first, second, third, and fourth M1, M2, M3 and M4 at the same time. Reference characters W1 through W4 denote first through fourth write clock signals sequentially applied to the first through fourth FIFO memories and reference character R denotes the read clock signal.

Referring to FIG. 14, the first through fourth write clock signals W1 through W4 are sequentially generated in every ¼ cycle of the horizontal synchronization signal Hs and sequentially applied to the first through fourth FIFO memories. In this process, the read clock signal R is generated by the fourth write clock signal W4, lasts until first through third write clock signals W1 through W3 used for storing next video signals are completely generated, and is read with the generation of a new fourth write clock signal W4. This means that video information is written in the first through third FIFO memories M1 through M3, and then video information written in the first through fourth FIFO memories M1 through M4 is read at the same time when video information is written in the fourth FIFO memory M4.

As described above, in a laser video projector according to the present invention, a plurality of scan lines are simultaneously processed and scanned. Thus, an optic modulator's capability to process a video signal and the scanning speed of an optic scanner can be improved. The resolution of video image projected in proportion to the number of optic modulation channels can be constantly increased. Thus, limitations in the performance of the optic modulator and the optic scanner can be overcome. The laser video projector can be made small by using laser emitting sources, optical fibers, and micro focusing lenses. Since components can be disposed in predetermined positions due to the optical fibers, the degree of freedom for arranging the components increases. Also, since the optical fibers can be easily arranged by using arrangement stages, the components can be well arranged.

Furthermore, in a case where a plurality of semiconductor laser diodes are used, a video image of high brightness can be realized by collecting a low power laser diodes.

The present invention has been particularly shown and described with reference to exemplary embodiments thereof. However, the embodiments of the present invention can be modified into various other forms, and the scope of the present invention must not be interpreted as being restricted to the embodiments. For example, it will be understood by those of ordinary skill in the art that first through third multi-channel acousto-optic modulators and optical fibers can be stacked, rather than being arranged in a line. In other words, after the first through third multi-channel acousto-optic modulators are sequentially stacked, four optical fibers each of twelve optical fibers can be stacked. Moreover, in a laser video projector, a light generating portion can be constituted according to a first embodiment of the present invention and an optic combining portion can be constituted according to a second embodiment of the present invention or vice versa. Also, in the laser video projector, the light generating portion can be constituted according to a third embodiment of the present invention and the optic combining can be constituted according to the first or second embodiment of the present invention. In addition, the laser video projector can be constituted, using a portion of elements of the conventional laser video projector shown in FIG. 1. Thus, the scope of the present invention must be defined by the appended claims not by the above-described embodiments.

What is claimed is:

1. A method for driving a laser video projector including an analog/digital converter that converts an analog video signal to a digital signal and a plurality of FIFO memories that are connected to the analog/digital converter to write the digital signal,
wherein video signals read from the analog/digital converter are sequentially written in the plurality of FIFO memories,
the video signals are read from the plurality of FIFO memories when a video signal is written in the last one of the plurality of FIFO memories, and
the analog video signal is one of R, G and B signals.

2. The method of claim 1, wherein the video signals are red video signals, green video signals, or blue video signals.

3. The method of claim 1, wherein the video signals are read from the plurality of FIFO memories at a speed lower than a speed for writing the video signals in the plurality of FIFO memories.

4. A circuit for driving a laser video projector including an analog/digital converter that converts an analog signal to a digital signal, a memory in which the analog signal is written, digital/analog converters that convert video information read from the memory to analog signals, and an optic modulator that modulates light by using the analog signal read from the digital/analog converter,
wherein the memory includes a plurality of FIFO memories in which video signals read from the analog/digital converter are sequentially written,
the number of the digital/analog converters is equal to the number of the plurality of FIFO memories,
the optic modulator includes as many optic modulation channels as the plurality of FIFO memories,
the analog signal is one of R, G and B signals, and
the FIFO memories are connected to the analog/digital converter.

* * * * *